(12) United States Patent
Shrestha et al.

(10) Patent No.: US 12,120,556 B2
(45) Date of Patent: Oct. 15, 2024

(54) MULTIPLEXING OF MULTIPLE HANDOVER COMMANDS

(71) Applicant: QUALCOMM Incorporated, San Diego, CA (US)

(72) Inventors: Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/806,457

(22) Filed: Jun. 10, 2022

(65) Prior Publication Data

US 2023/0403610 A1 Dec. 14, 2023

(51) Int. Cl.
*H04W 36/00* (2009.01)
*H04L 5/00* (2006.01)

(52) U.S. Cl.
CPC ....... *H04W 36/0009* (2018.08); *H04L 5/0053* (2013.01); *H04W 36/0061* (2013.01); *H04W 36/00835* (2018.08)

(58) Field of Classification Search
CPC ......... H04W 36/0009; H04W 36/0061; H04W 36/00835; H04W 36/083; H04L 5/0053
See application file for complete search history.

(56) References Cited

U.S. PATENT DOCUMENTS

| | | | |
|---|---|---|---|
| 2019/0037449 A1* | 1/2019 | Fujishiro | H04W 4/40 |
| 2020/0314914 A1* | 10/2020 | Roy | H04W 36/0077 |
| 2022/0046486 A1 | 2/2022 | Shrestha et al. | |
| 2024/0162978 A1* | 5/2024 | Cheema | H04W 36/12 |

OTHER PUBLICATIONS

International Search Report and Written Opinion—PCT/US2023/018381—ISA/EPO—Oct. 17, 2023.
Mediatek Inc: "Handover Enhancement in Leo-Satellite Based NTN", 3GPP TSG-RAN WG2 Meeting #105-Bis, R2-1903062, 3rd Generation Partnership Project, Mobile Competence Centre, 650, Route Des Lucioles, F-06921 Sophia-Antipolis Cedex, France, vol. RAN WG2, No. Xi'an, China, Apr. 8, 2019-Apr. 12, 2019, Mar. 28, 2019, 3 pages, XP051692344, The Whole Document.
Qualcomm Incorporated: "Further Handover Enhancement for NTN", 3GPP TSG-RAN WG2 Meeting #121, R2-2300885, 3rd Generation Partnership Project, Mobile Competence Centre, 650, Route Des Lucioles, F-06921 Sophia-Antipolis Cedex, France, vol. RAN 2, No. Athens, GR, Feb. 27, 2023-Mar. 3, 2023, Feb. 17, 2023, 6 pages, XP052245528, The Whole Document.

* cited by examiner

*Primary Examiner* — Hashim S Bhatti
(74) *Attorney, Agent, or Firm* — Procopio, Cory, Hargreaves & Savitch LLP

(57) ABSTRACT

Apparatus, methods, and computer program products for handover are provided. An example method may include receiving a physical downlink shared channel (PDSCH) transmission from a network entity, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU). The example method may further include processing a first subset of the MAC SDUs that are associated with the UE and discard a second subset the MAC SDUs that are not applicable to the UE.

30 Claims, 16 Drawing Sheets

MULTIPLEXING OF MULTIPLE HANDOVER COMMANDS

TECHNICAL FIELD

The present disclosure relates generally to communication systems, and more particularly, to wireless communication systems with a handover mechanism.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive a physical downlink shared channel (PDSCH) transmission from a network entity, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU). The memory and the at least one processor coupled to the memory may be further configured to process a first subset of the MAC SDUs that are associated with the UE and discard a second subset the MAC SDUs that are not applicable to the UE, the first subset of MAC SDUs including a common MAC SDU and at least a UE specific MAC SDU. The memory and the at least one processor coupled to the memory may be further configured to connect to a target network entity based on a group handover configuration in the set of group handover configurations, the group handover configuration being associated with the UE.

In another aspect of the disclosure, a method, a computer-readable medium, and an apparatus at a network entity are provided. The apparatus may include a memory and at least one processor coupled to the memory. The memory and the at least one processor coupled to the memory may be configured to transmit a PDCCH transmission associated with a group RNTI scheduling a PDSCH transmission for a set of UEs, the group RNTI being associated with each UE in the set of UEs. The memory and the at least one processor coupled to the memory may be further configured to transmit the PDSCH transmission, the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU, the set of MAC SDUs including a common MAC SDU for the set of UEs and a subset of SDUs for each respective UE in the set of UEs.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
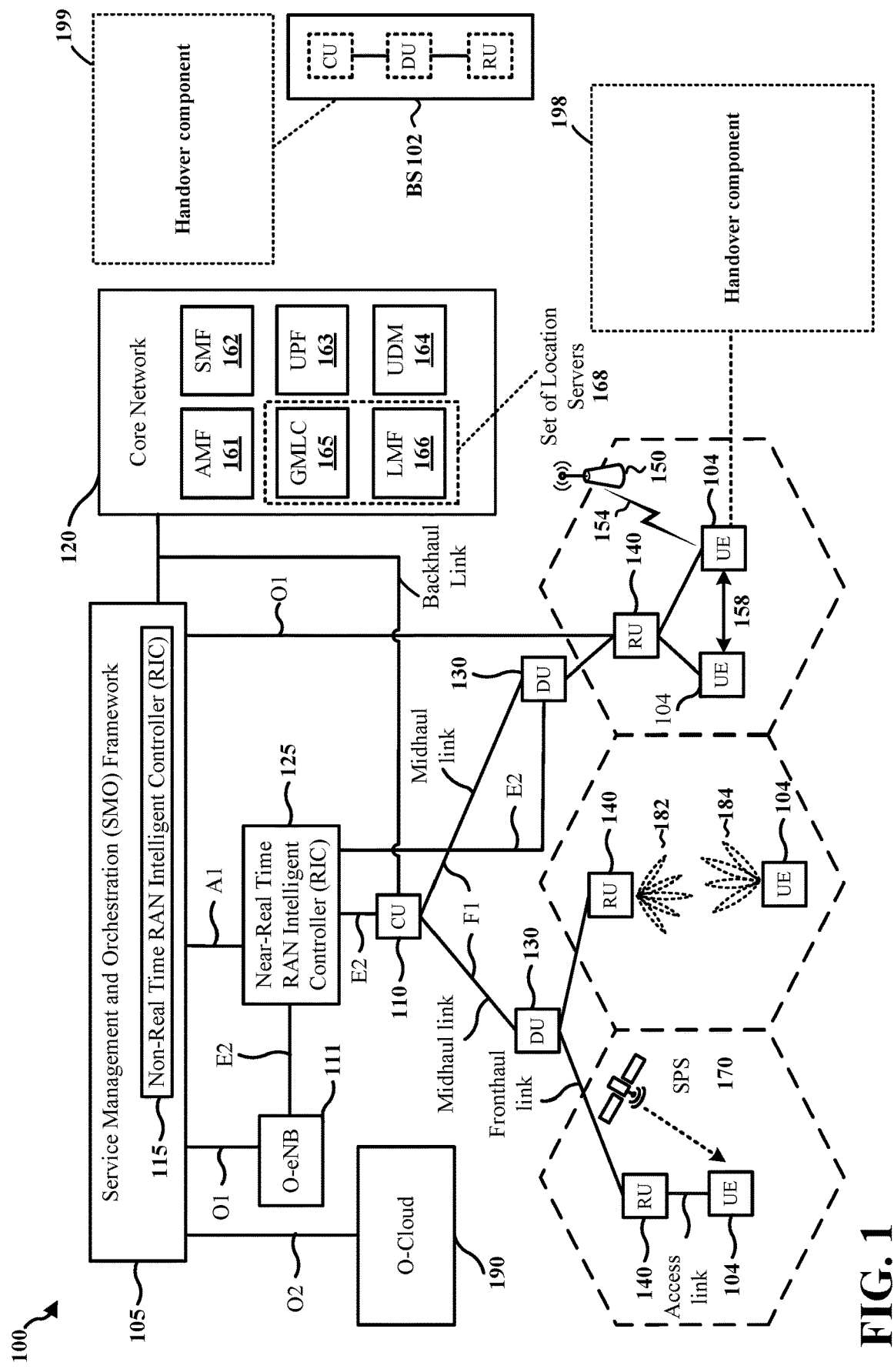
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a handover component 198. In some aspects, the handover component 198 may be configured to receive a physical downlink shared channel (PDSCH) transmission from a network entity, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU). In some aspects, the handover component 198 may be further configured to process a first subset of the MAC SDUs that are associated with the UE and discard a second subset the MAC SDUs that are not applicable to the UE, the first subset of MAC SDUs including a common MAC SDU and at least a UE specific MAC SDU. In some aspects, the handover component 198 may be further configured to connect to a target network entity based on a group handover configuration in the set of group handover configurations, the group handover configuration being associated with the UE.

In certain aspects, the base station 102 may include a handover component 199. In some aspects, the handover component 199 may be configured to transmit a PDCCH transmission associated with a group RNTI scheduling a PDSCH transmission for a set of UEs, the group RNTI being associated with each UE in the set of UEs. In some aspects, the handover component 199 may be further configured to transmit the PDSCH transmission, the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU, the set of MAC SDUs including a common MAC SDU for the set of UEs and a subset of SDUs for each respective UE in the set of UEs.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
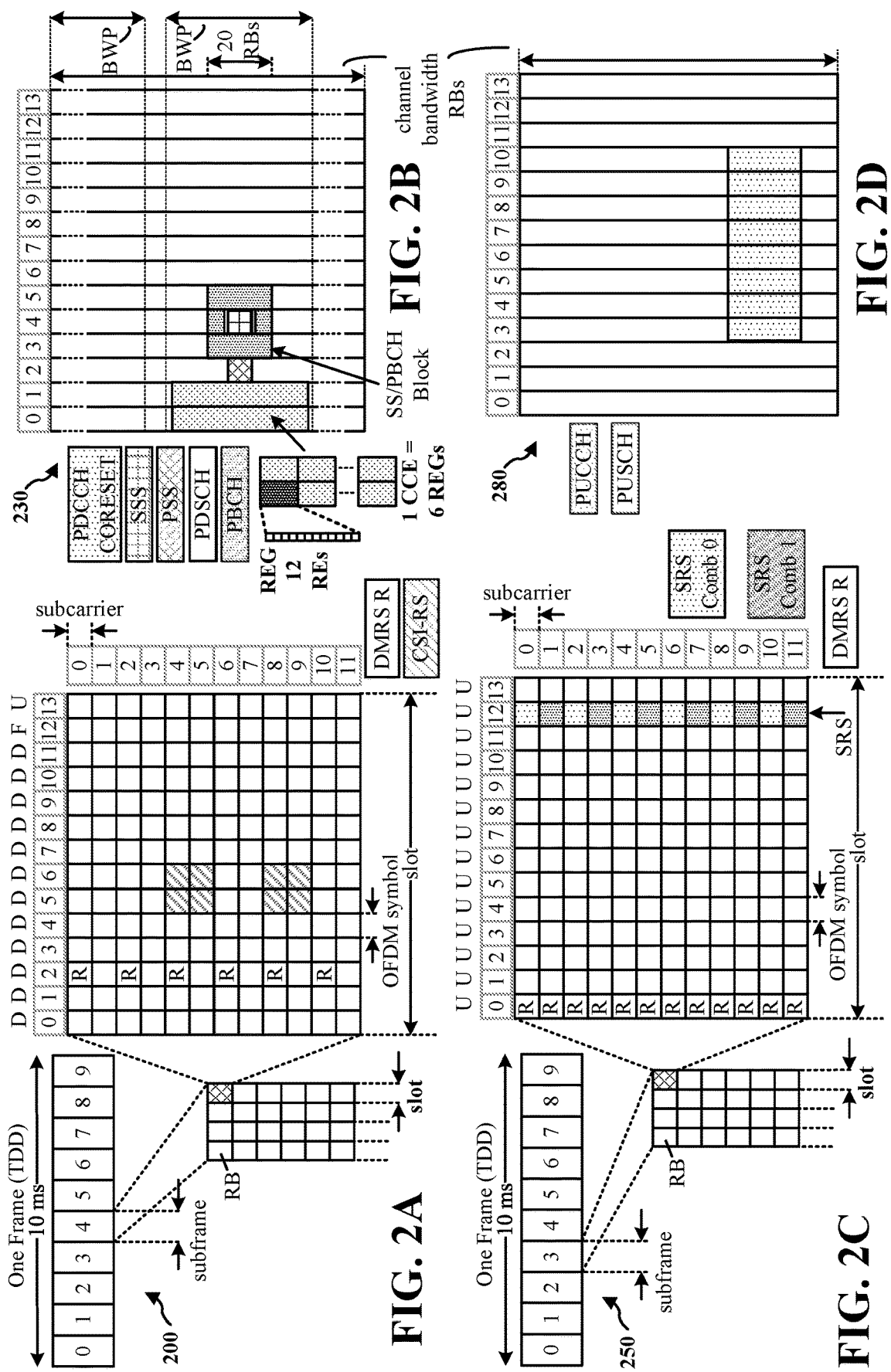
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
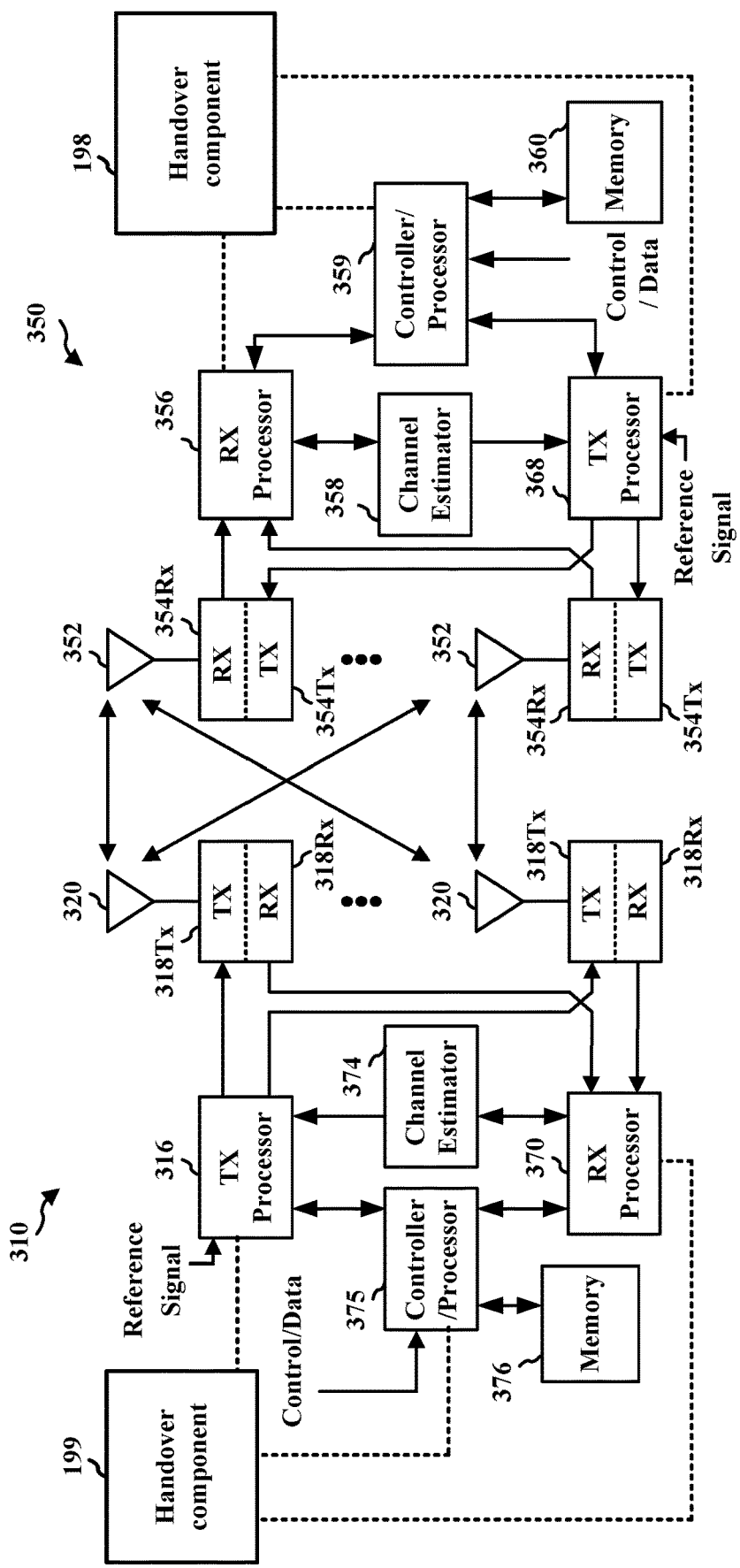
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with handover component 198 of FIG. 1.

At least one of the TX processor 316, the RX processor 370, and the controller/processor 375 may be configured to perform aspects in connection with handover component 199 of FIG. 1.

Figure 4:
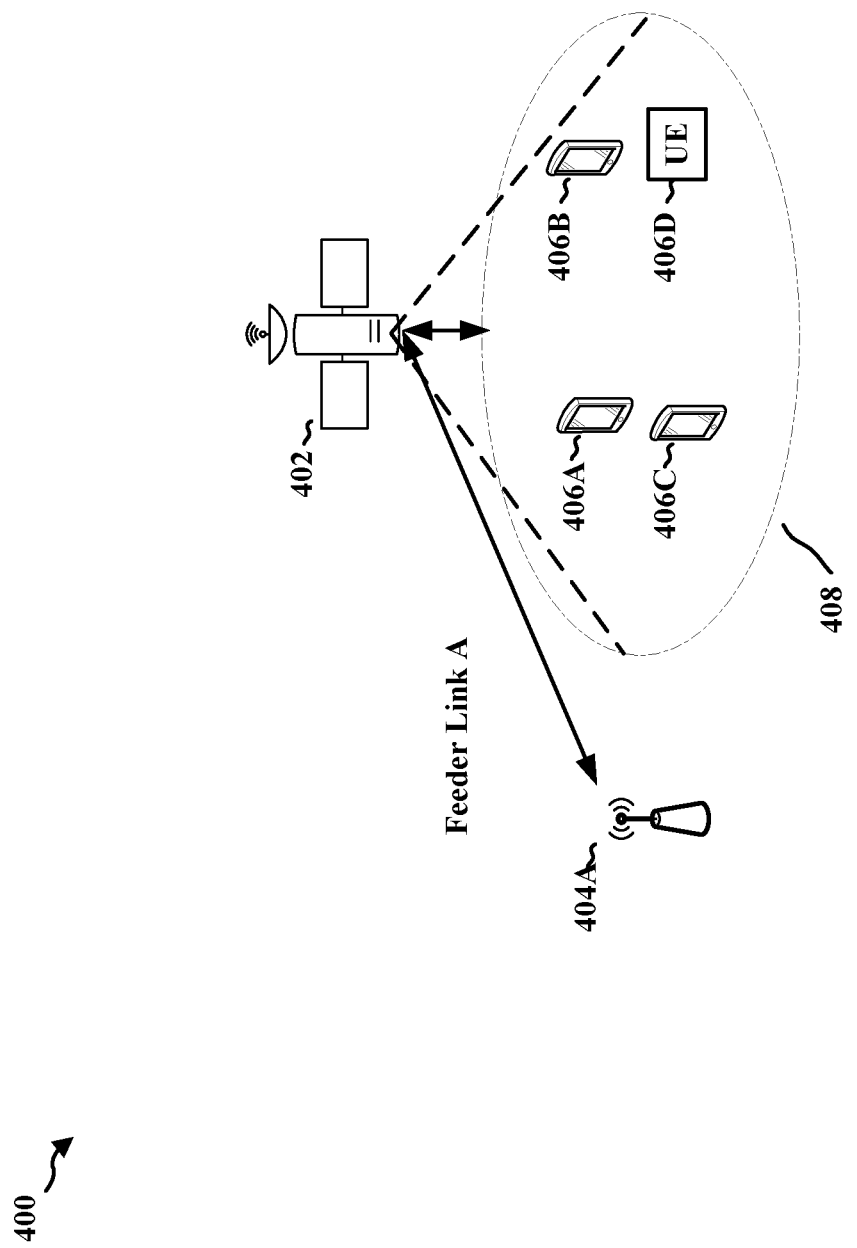
FIG. 4 is a diagram illustrating example wireless communication environments with a satellite.

FIG. 4 is a diagram 400 illustrating example wireless communication environments with a satellite. As illustrated in FIG. 4, a satellite 402 may be an intermediary for communication between a network entity 404A and a group of UEs 408 including one or more UEs 406A, 406B, 406C, and 406D. Four UEs are shown for illustrative purpose. The network entity 404A may transmit a signal encoding data, such as user data or control data for any UE in the group of UEs 408, to the satellite 402. The satellite 402 may relay the data, such as by performing amplification, spatial filtering, or frequency conversion, to one or more UEs in the group of UEs 408. Any UE in the group of UEs 408 may communicate with the network entity 404A by transmitting a signal encoding data, such as user data of the UE, to the satellite 402. The satellite 402 may then relay the data, such as by performing amplification, spatial filtering, or frequency conversion, to the network entity 404A. The communication (i.e., radio link) between the network entity 404A and the satellite 402 may be referred to as a feeder link A. In some aspects, the satellite 402 is a transparent satellite that is configured to perform amplification, spatial filtering, or frequency conversion. In some aspects, the satellite 402 is a regenerative satellite that may additionally perform other signal processing for relaying such as decoding, interference cancellation, signal regeneration but does not have the full functionality of a network entity.

Figure 5:
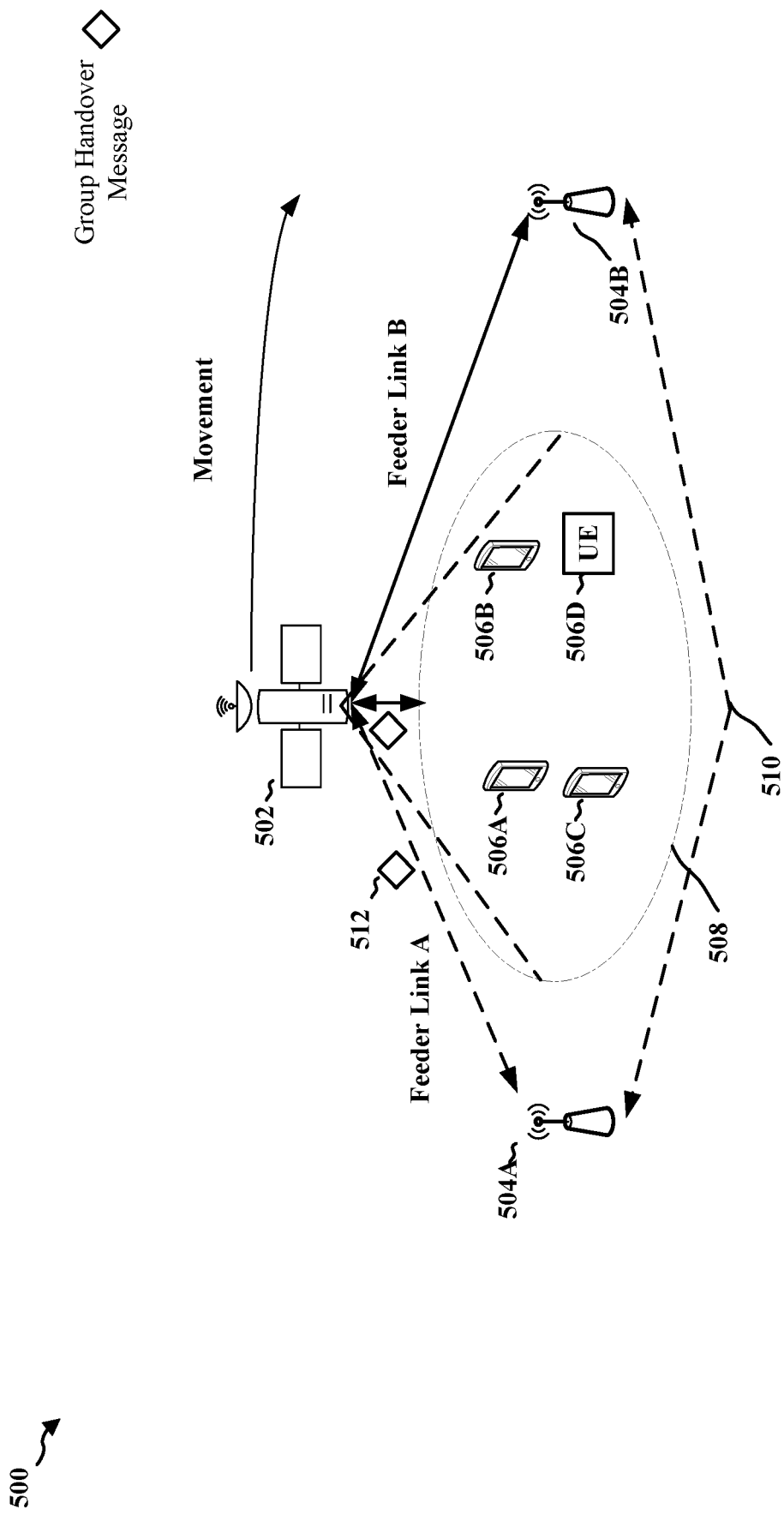
FIG. 5 is a diagram illustrating example wireless communication environments with a satellite.

FIG. 5 is a diagram 500 illustrating example wireless communication environments with a satellite. As illustrated in FIG. 5, as the satellite 502 moves (e.g., by orbiting around the Earth), the satellite 502 may move out of a coverage area or transmission range of the network entity 504A. Therefore, the network entity 504A may handover the group of UEs 508 including a UE 506A, a UE 506B, a UE 506C, and a UE 506D, to another network entity 504B that would have the satellite 502 in its coverage area. The satellite 502 may switch the feeder link from network entity 504A to network entity 504B. The network entity 504A and the network entity 504B may be connected at 510 with each other via a core network, such as core network 190 or EPC 160 shown in FIG. 1. The network entity 504A may transmit a handover request to the network entity 504B and the network entity 504B may acknowledge the handover request. The handover request may request to handover the group of UEs to the network entity 504B. To signal the handover to the group of UEs 508, the network entity 504A may transmit a group handover message 512 to the group of UEs 508. The group handover message 512 may be transmitted to the group of UEs 508 from the network entity 504A via the satellite 502. The group of UEs 508 may establish a connection with the network entity 504B via the satellite 502 based on the group handover message. Because the group of UEs 508 established connection with the network entity 504B, the satellite 502 switched the feeder link from network entity 504A to network entity 504B.

Figure 6:
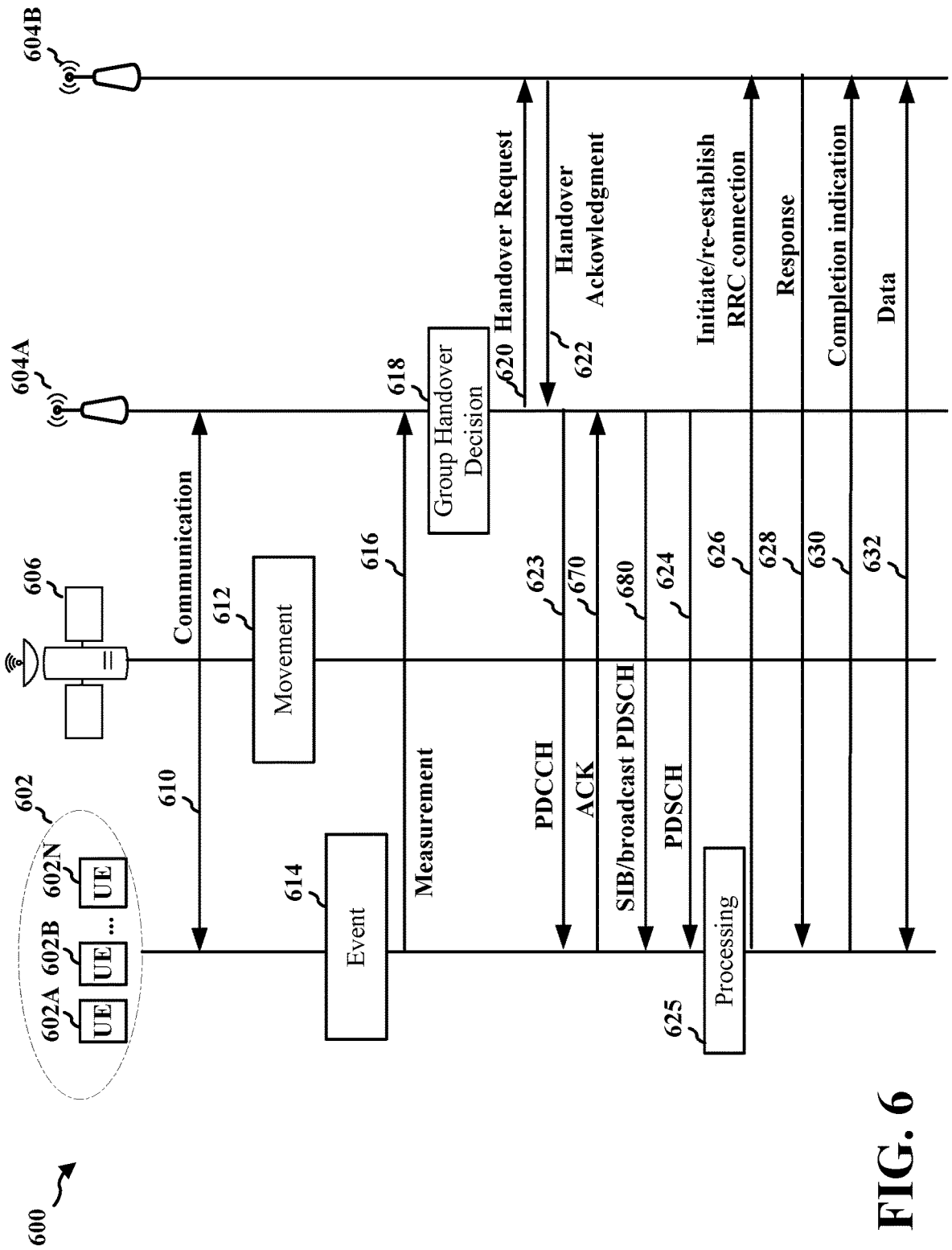
FIG. 6 is a diagram illustrating an example communication flow between a group of UEs and network entities that communicate via a satellite.

FIG. 6 is a diagram illustrating an example communication flow between a group of UEs and network entities that communicates via a satellite. FIG. 6 is an example communication flow 600 between a group of UEs and network entities that communicates via a satellite. As illustrated in FIG. 6, a group of UEs 602 including one or more UEs including the UE 602A, the UE 602B, and the UE 602N may be in communication 610 with a network entity 604A via a satellite 606. One group of UEs are illustrated and discussed as an example, but there may be multiple groups of UEs. The UEs 602A-502N may have an RRC connection with the network entity 604A, for example. In some aspects, communication 610 between the network entity 604A and the UEs in the group of UEs 602 may be exchanged via the satellite 606. The communication 610 may include data, control, etc. The communication 610 may include downlink communication and/or uplink communication. The network entity 604A and the network entity 604B may be network nodes. In some aspects, the network entity 604A and the network entity 604B may be a base station that may be implemented as an aggregated base station, as a disaggregated base station, an integrated access and backhaul (IAB) node, a relay node, a sidelink node, or the like. A network entity may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. In some aspects, the network entity may be part of the Terrestrial or Non-Terrestrial Network or combination of.

The network entity 604A may transmit a signal encoding data, such as user data or control data for one UE in the group of UEs 602, to the satellite 606. The satellite 606 may relay the data, such as by performing amplification, spatial filtering, or frequency conversion, to one or more UEs in the group of UEs 602. A UE in the group of UEs 602 may communicate with the network entity 604A by transmitting a signal encoding data, such as user data of the UE, to the satellite 606. The satellite 606 may then relay the data, such as by performing amplification, spatial filtering, or frequency conversion, to the network entity 604A. The communication link (i.e., radio link) between the network entity 604A and the satellite 606 may be referred to as a feeder link A. In some aspects, the satellite 606 is a transparent satellite that is configured to perform amplification, spatial filtering, or frequency conversion. In some aspects, the satellite 606 is a regenerative satellite that may additionally perform other signal processing for relaying such as decoding, interference cancellation, signal regeneration but does not have the full functionality of a base station.

The satellite 606 may move (such as by orbiting around the Earth). As the satellite 606 moves at 612, the satellite may move out of a coverage area of the network entity 604A. In some aspects, the UEs in the group of UE 602 may determine the occurrence of a trigger event 614 based on any of a variety of parameters such as 1) measurement events related to cell quality or propagation delay (e.g., when a measured quality is below a threshold or a delay is above a threshold), 2) location of the UEs and the satellite, 3) one or more timers that are configured in accordance with serve time and expected movement of the satellite, or 6) elevation angles of source and target cells. The UEs in the group of UEs 602 may report the occurrence of the event 616 (e.g., the measurement events) to the network entity 604A. In some examples, the occurrence of the event may be determined at the base station, e.g., based on measurement information from one or more of the UEs in the group of UEs 602, one or more timers, a location of the satellite or the UEs, etc. The network entity 604A may determine to initiate a group handover for the group of UEs 602. The network entity 604A may determine, at 618, to initiate a group handover for the group of UEs 602. The determination may be based on any of a variety of triggering events. For example, the network entity 604A may determine to initiate the group handover based on measurement-based triggering where cell quality for the group of UEs 602 has exceeded or fallen below a configured threshold. Alternatively or additionally, the network entity 604A may determine to initiate the group handover based on locations of the group of UEs 602 and/or a location of the satellite 606. Alternatively or additionally, the network entity 604A may determine to initiate the group handover based on additional triggering conditions based on timing advance value to the target cell. Alternatively or additionally, the network entity 604A may determine to initiate the group handover based on elevation angles of source and target cells. The network entity 604A may determine to initiate the group handover based on measurements from the group of UEs 602 or independent of the measurements performed by the group of UEs 602.

After the network entity 604A determines, at 618, to handover the group of UEs 602, the network entity 604A may transmit a handover request 620 to the network entity 604B and receive a handover acknowledgment 622 from the network entity 604B. Then the network entity 604A may transmit a PDSCH 624 to the group of UEs 602. Each UE in the group of UEs processes the PDSCH 624, as illustrated at 625, in order to determine that the UE is being handed over to a target base station.

In some aspects, as part of the handover acknowledgment 622 or the PDSCH 624, the network entity 604A may transmit an RRC reconfiguration with synchronization message in a PDSCH that includes group handover messages, or group handover commands, to the group of UEs 602. A cell specific common search space may be configured, and the group of UEs 602 may monitor the cell specific common search space to receive the PDSCH indicating the HO command for the group of UEs. The group handover command may include bits that are scrambled based on a cell specific group radio network temporary identifier (RNTI). Signaling radio bearer 1 (SRB1) information may provide a UE specific configuration, and UE specific integrity protection and ciphering of the RRC message may be applied for the SRB1 information for each individual UE in the group.

An SRB-x, such as SRB 3 or SRB 6, may include group specific configuration information and may be protected with security information that is known to each of the UEs in the group. For example, access stratum (AS) security information may be transmitted to the group of UEs 602, and the signaling radio bearer information may be sent to the group of UEs with integrity protection and ciphering based on the AS security information for the group of UEs. A common group AS key may be provided to each UE in the group of UEs 602 upon joining of the group. In some aspects, the common group AS key may be derived using a set of cell specific or group specific parameters. For the group handover, the base station may transmit an RRC message that includes a list of RRC reconfiguration messages for multiple UEs. The RRC reconfiguration messages may include delta RRC configuration for each UE based on the particular UE's current configuration. A delta RRC configuration may refer to a configuration that includes parameters that are different than the UE's current configuration without including parameters that are the same as the UE's current configuration. In some aspects, one or more UE in the group of UEs 602 may not be provided with an RRC reconfiguration by the base station. The UE may interpret the absence of an RRC reconfiguration, or an RRC reconfiguration delta, as an indication to continue to use the UE's current RRC configuration with the target base station. In such aspects, a UE in the group of UEs 602 may continue to 626 to initiate an RRC connection with the target network entity 604B using their respective current RRC configuration. The UEs in the group of UEs 602 may receive a response from the network entity 604B at 628 and may transmit an RRC reconfiguration completion indication at 630. At 632, the UEs in the group of UEs 602 may transmit or receive user data with the target network entity 604B. In some aspects, the communication (e.g., data 632) between the network entity 604B and the UEs in the group of UEs 602 may be exchanged via the satellite 606.

In some aspects, the network entity 604A may transmit the PDSCH 624 including multiple RRC messages to the group of UEs 602. The multiple RRC messages may be multiplexed at medium access control (MAC) using one or more same or different logical channel identifiers (LCIDs). Each UE in the group of UEs 602 may attempt to decode all of the RRC messages in the multiplexed RRC messages (such as in SRB1). In some aspects, each UE may utilize a current SRB1 configuration and AS security profile for the particular UE to attempt to decode the multiple RRC messages. A UE in the group of UEs may decode a single RRC message from the multiplexed RRC messages based on the UE's AS security profile, e.g., one RRC message will pass the integrity protection check for the UE. In some aspects, each UE may use a default SRB1 configuration. After decoding the RRC messages, the UEs in the group of UEs 602 may initiate RRC reconfiguration with the target network entity 604B. The UEs in the group of UEs 602 may receive a response 628 from the network entity 604B and may transmit an RRC reconfiguration completion indication 630. After establishing the connection with the target base station, the UEs in the group of UEs 602 may transmit or receive user data 632 with the target network entity 604B.

Each UE may be able to decode one RRC message intended for the UE and may fail to decode the other RRC messages that are not intended for the UE because the other RRC messages will fail an integrity protection check and may be subsequently discarded. Each RRC reconfiguration may include a delta configuration based on default UE configuration for the target. The delta configuration may refer to a configuration that includes parameters that are different than the default configuration (e.g., the target serving cell configuration) without including parameters that are the same as the default configuration. The size of the group (e.g., the number of UEs in the group of UEs 602) may be configured by a network to fit the group handover message in a single transport block signal (TBS) size. For example, the number of UEs in the group of UEs may be based on an amount of group handover information that can be transmitted in one or more TBSs, e.g., in a single TBS.

In some aspects, the PDSCH 624 may be transmitted in a broadcast or a groupcast message that is received by the group of UEs. In some aspects, the broadcast or groupcast message may be protected using common security keys for the group of UEs 602. The common security keys may be provided to the group of UEs 602 using dedicated RRC signaling. In some aspects, based on time and/or location, each UE in the group of UEs 602 may check the broadcast or groupcast message to determine if the PDSCH 624 is provided for a target cell of the target network entity 604B. In some aspects, the network entity 604A may transmit (e.g., in communication 610) a group specific or UE specific indication to each UE in the group of UEs 602 to check the broadcast or groupcast message to schedule the time for the PDSCH 624 to be transmitted as a broadcast message. In some aspects, the scheduling information may be provided to the group of UEs in the group handover message. In some aspects, the scheduling information may be provided to the group of UEs using an RRC reconfiguration upon a UE moving to RRC connected state or may be broadcast in system information, such as a SIB1. In some aspects, each UE in the group of UEs 602 may acquires the broadcast or groupcast PDSCH before accessing the target cell at 626. The broadcast or groupcast message may be protected using common security keys for the group of UEs. The common security keys may be provided to the group of UEs in dedicated signaling for the group of UEs or to each UE in the group of UEs. If no group handover message is configured or received, each UE in the group of UEs 602 can initiate RRC re-establishment procedure at 626, such as based on preconfigured time/location. The UEs in the group of UEs 602 may receive a response 628 from the network entity 604B and may transmit an RRC reconfiguration completion indication 630. Then, the UEs in the group of UEs 602 may transmit or receive user data 632 with the target network entity 604B.

The RRC reconfigurations may include delta configurations. The delta configuration may be based on each UE's source configuration or current configuration. The delta configuration may indicate parameters of the configuration that are different than the UE's source configuration or a default configuration without indicating parameters that will remain unchanged. In some aspects, the delta configuration for each UE in the group of UEs 602 may be based on a default UE configuration for the target network entity 604B. The default UE configuration for the target network entity 604B may be a full configuration of parameters for communication with the target base station. In some aspects, the default UE configuration for the target network entity 604B may be provided before the handover decision at 618. In some aspects, the group handover message may provide common target serving cell configuration for each UE in the group of UEs. A list of RRC reconfigurations may include delta configuration that individually indicate one or more parameters that will be changed for each UE.

In some aspects, the group handover message may include an indication to continue to use a current source cell configuration. In some aspects, the target network entity 604B may accept the same UE radio configuration that was used in the source network entity 604A. The cell specific/carrier specific configuration for the UEs may be the same. Security keys may be different between the source base station and the target base station, and the UEs may receive a next hop chaining counter (NCC) and/or a cell radio network temporary identifier (C-RNTI) for the target base station in the group handover message.

A new feeder link to a new base station may lead to a different time delay for communication. In some aspects, the group handover message may include a new round trip delay (RTD) value between satellite and gateway (i.e., the target network entity 604B). The new RTD value may be used by each UE in the group of UEs 602 for uplink pre-compensation, such as in uplink transmissions in 626, 630, and 632. The new RTD value may be included in a system information block (SIB).

In some aspects, if timing advance (TA) would be different for the target network entity 604B compared with the network entity 604A, the network entity 604A may provide adjustment to TA using UE specific or group specific indication (e.g., DCI using group RNTI) to adjust the feeder link propagation delay which is common to each UE in the group of UEs in the group of UEs 602. The pre-compensation applied to the UE to satellite link may remain the same. The UEs in the group of UEs 602 may use the same TA for the target network entity 604B without receiving an indication of TA adjustment. In some aspects, the UEs in the group of UEs 602 may read system information to receive the latest common configuration that may include paging, random access and initial pre-compensation TA values for initial access before initiating the RRC access with network entity 604B at 626. In such aspects, the group handover message may not include common configuration or system information to reduce the size of the handover message and the UEs in the group of UEs 602 may initiate the RRC access with network entity 604B at 626 based on preconfigured execution condition, such as time, location, or the like.

In some aspects, SIB in the cell is considered not changed after the feeder link changes from network entity 604A to network entity 604B. The information regarding SIB may be transparent to UEs in IDLE mode or RRC_INACTIVE mode. For such UEs, changes in RTD may not trigger SI updating procedure.

In aspects where each UE in the group of UEs 602 attempts to decode all of the multiple RRC messages in the multiplexed RRC messages (such as in SRB1), each of the multiple RRC messages in the PDSCH 624 may include the target serving cell configuration (that may be common for each of the UEs) (e.g., RRC configuration associated with a target serving cell of the network entity 604B). As a result, the PDSCH 624 may include multiple copies of the common configuration. Some aspects provided herein may improve efficiency of the group handover procedure by reducing the signaling overhead (e.g., associated with the PDSCH 624).

In some aspects, before the PDSCH 624 is transmitted to the group of UEs 602, a group RNTI may be configured for the group of UEs 602. As used herein, the term "group RNTI" may refer to a RNTI configured for a group of UEs. In such aspects, the PDSCH 624 may be transmitted to the group of UEs 602 based on the group RNTI. In some aspects, the group RNTI may be configured in a PDCCH 623 transmitted from the network entity 604A to the group of UEs 602. In some aspects, the PDCCH 623 may schedule the PDSCH 624. In addition to the group RNTI, an index may be configured to indicate association between the multiple RRC messages with respective UEs in the group of UEs 602. For example, if the index configured for the UE 602B is 2, then the second RRC message in the PDSCH may be associated with the UE 602B.

In some aspects, upon receiving the PDCCH 623, each UE in the group of UEs 602 may indicate HARQ process ID (e.g., in ACK 670) to receive the PDSCH 624. In some aspects, HARQ process ID=0 may be used independent of HARQ process ID field. In some aspects, a multiple bit (e.g., 4 bit/5 bit) HARQ process ID field may be reused for other purposes. In some aspects, a HARQ process ID may be reserved for the PDCCH 623. In some aspects, the new data indicator (NDI) field may be toggled. In some aspects, another scheduled feedback in the reserved HARQ process ID may be canceled. In some aspects, the HARQ process ID (e.g., in ACK 670) to receive the PDSCH 624 may be independent of a feedback enabled/disabled configuration for the HARQ process (e.g., the HARQ process ID).

In some aspects, instead of including the target serving cell configuration in each of the multiple RRC messages, the target serving cell configuration may be provided in a separate common MAC SDU (e.g., included in a separate RRC message carried by the common MAC SDU). As used herein, the term "MAC SDU" may refer to a service data unit that may be received from the logical link control sub-layer which lies above the MAC sub-layer in a protocol stack. The logical link control sub-layer and the MAC sub-layer may be collectively referred to as a data link layer. In some aspects, the common MAC SDU may be provided in SIB or broadcast PDSCH 680 and may be broadcasted by the network entity 604A. In some aspects, the SIB or broadcast PDSCH 680 may be readable to all UEs in communication with the network entity 604A including the group of UEs 602. In some aspects, the common MAC SDU may be included in the PDSCH 624.

In some aspects, the target serving cell configuration may be absent from a reconfigurationWithSync information element (IE) representing parameters for the synchronous reconfiguration to the target special cell (SpCell). In some aspects, a SS/PBCH block measurement timing configuration (SMTC) may be provided to the group of UEs 602 in a format based on the reconfigurationWithSync IE. In some aspects, the target serving cell configuration may be carried in a separate RRC message (e.g., separate from the SMTC). In some aspects, a DLInformationTransfer message representing transfer of non-access stratum (NAS) may include the target serving cell configuration. In some aspects, an RRC transaction identifier (ID) associated with the common MAC SDU may be not used. In some aspects, the group of UEs 602 may or may not transmit an ACK associated with the common MAC SDU. In some aspects, the common MAC SDU may further include a frequency or cell ID of the target serving cell.

Figure 7:
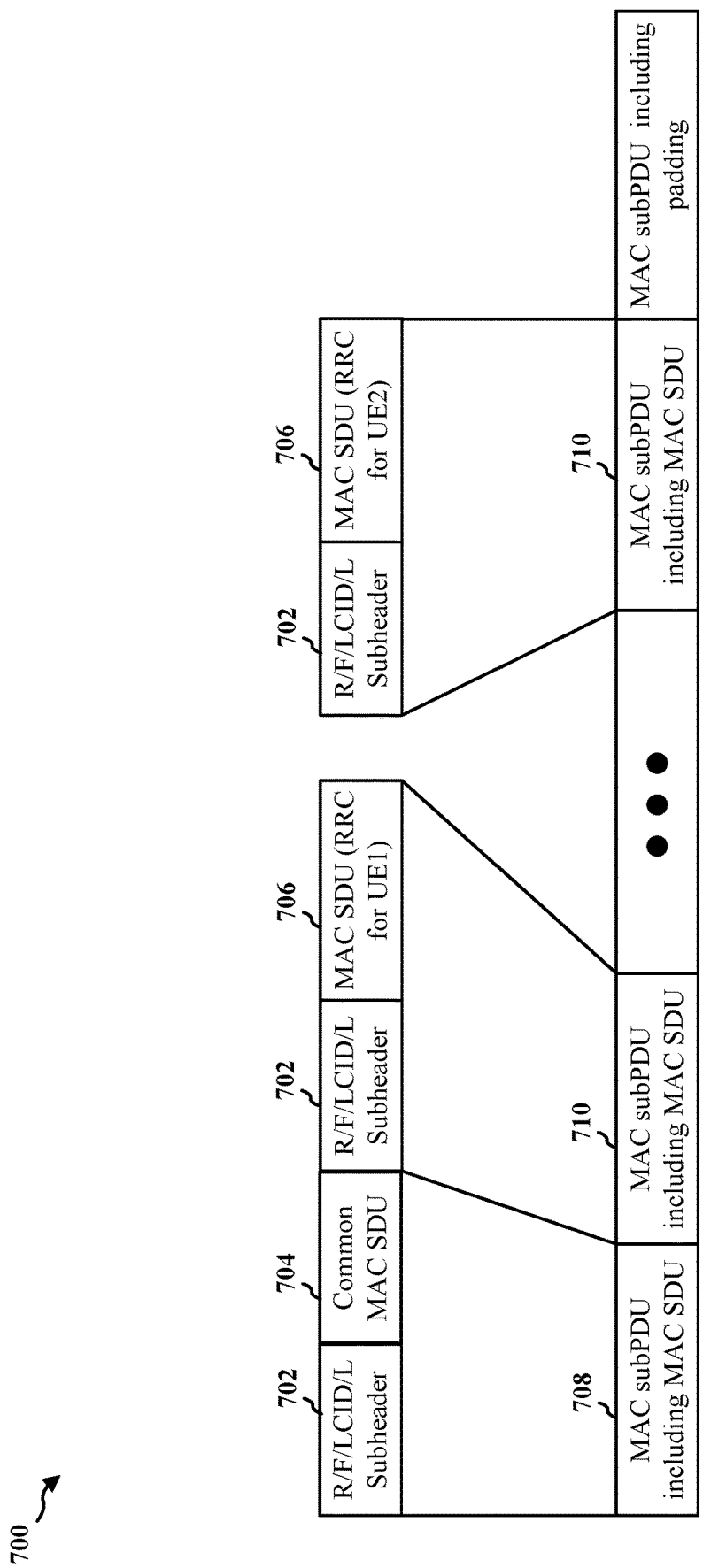
FIG. 7 is a diagram illustrating an example MAC PDU.

In some aspects, the PDSCH 624 may be a MAC PDU including the multiple RRC messages (which may also be referred to as "a group of RRC messages") for the group of UEs 602. As used herein, the term "MAC PDU" may refer to a protocol data unit that may include one or more subheaders, each of which providing information for decoding a corresponding MAC subPDU. A single MAC PDU may be packaged as a transport block (TB) and may be transmitted to a physical layer via a transport channel. A single MAC PDU may include multiple MAD SDUs and CEs. In some aspects, a LCID or extended LCID (eLCID) may identify the common MAC SDU and the RRC message carrying the target serving cell configuration. FIG. 7 is a diagram 700 illustrating example MAC PDU. As illustrated in FIG. 7, the MAC PDU may include a set of MAC subPDUs, some of which may be MAC subPDUs that includes MAC SDU. In some aspects, the MAC PDU may further include a MAB subPDU including padding. In some aspects, each MAC SDU 706 in a set of MAC subPDUs 710 may be carrying one RRC message of the multiple RRC messages associated with group of UEs 602. In some aspects, each RRC message carried by a MAC SDU in the MAC subPDUs 710 may include a respective group handover configuration for one UE in the group of UEs 602. As used herein, the term "group handover configuration" may refer to a configuration for a UE for connecting to a target network entity that may be bundled with other group handover configurations for other UEs in the group. In some aspects, the MAC PDU may include a MAC subPDU 708 that includes the common MAC SDU 704 carrying the RRC message carrying the target serving cell configuration. In some aspects, each MAC subPDU that includes a MAC SDU may also include a MAC subheader.

As used herein, the term "target serving cell configuration" may refer to a configuration associated with a target serving cell (e.g., of the network entity 604B). In some aspect, the target serving cell configuration may be represented by a delta configuration with respect to a default target cell configuration or a source cell configuration. As an example, a target serving cell configuration may include a physical cell ID, a downlink configuration, an uplink configuration, DM-RS configuration, rate match pattern configuration, transmit power configuration, SSB subcarrier configuration, timing advance offset configuration, or the like. In some aspects, as illustrated in FIG. 7, if the MAC PDU starts with the common MAC SDU (which may be with a LCID) that includes a default target cell configuration or a source cell configuration (e.g., associated with the network entity 604B) (which may be common to the group of UEs 602), the other MAC subheaders 702 associated with each MAC SDU 706 (each carrying one RRC message of the multiple RRC messages associated with group of UEs 602 which may each include respective group handover configuration for one UE in the group of UEs 602) may include an index associated with a respective UE in the group of UEs. In some aspects, the index may be configured to the respective UE via dedicated RRC message. As an example, if the UE 602B is configured with index 2, then the UE 602B may decodes the second MAC SDU 706 after the first common MAC SDU and other MAC SDUs 706 may be discarded by the UE 602B. In some aspects, each MAC SDU 706 may be configured with a priority (such as high priority) logical channel for SRBs. The other MAC SDUs 706 may be discarded based on the high priority while lower priority SDUs may be decoded.

Figure 8:
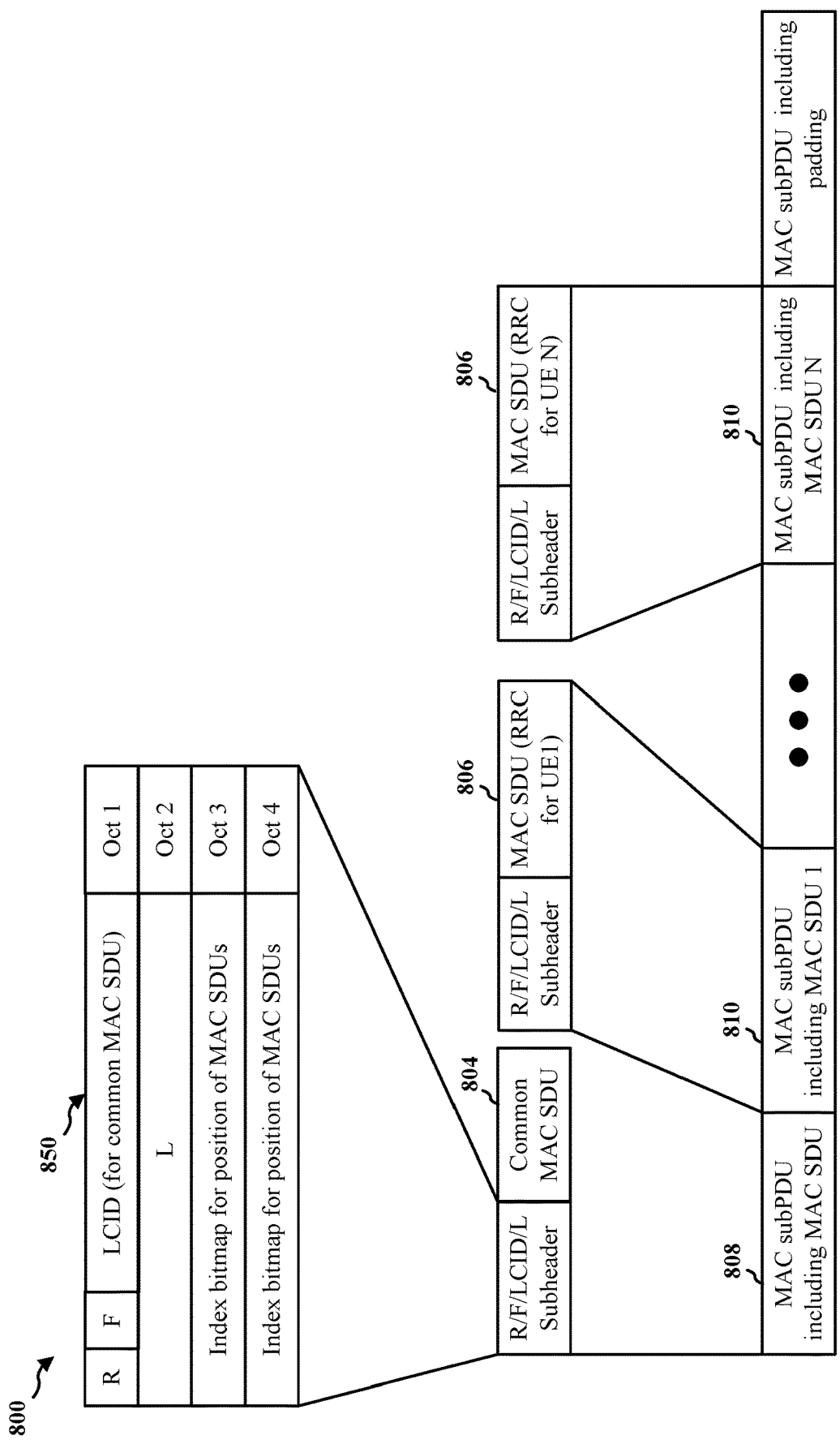
FIG. 8 is a diagram illustrating example indexing of SDUs.

In some aspects, a bitmap subheader (such as an 8× bitmap subheader) may be introduced for the LCID associated with the common MAC SDU. FIG. 8 is a diagram 800 illustrating example indexing of SDUs. As illustrated in FIG. 8, the MAC PDU may include a set of MAC subPDUs, some of which may be MAC subPDUs that includes MAC SDU. In some aspects, the MAC PDU may further include a MAB subPDU including padding. In some aspects, each MAC SDU 806 in a set of MAC subPDUs 810 may be carrying one RRC message of the multiple RRC messages associated with group of UEs 602. In some aspects, each RRC message carried by a MAC SDU in the MAC subPDUs 810 may include a respective group handover configuration for one UE in the group of UEs 602. In some aspects, the MAC PDU may include a MAC subPDU 808 that includes the common MAC SDU 804 carrying the RRC message carrying the default target cell configuration or a source cell configuration. In some aspects, each MAC subPDU that includes a MAC SDU may also include a MAC subheader. As illustrated in FIG. 8, a bitmap 850 may include one or more Octets representing index bitmap for position of MAC SDUs (each carrying one RRC message of the multiple RRC messages associated with group of UEs 602 which may each include respective group handover configuration for one UE in the group of UEs 602) associated with each UE in the set of UEs 602.

Figure 9:
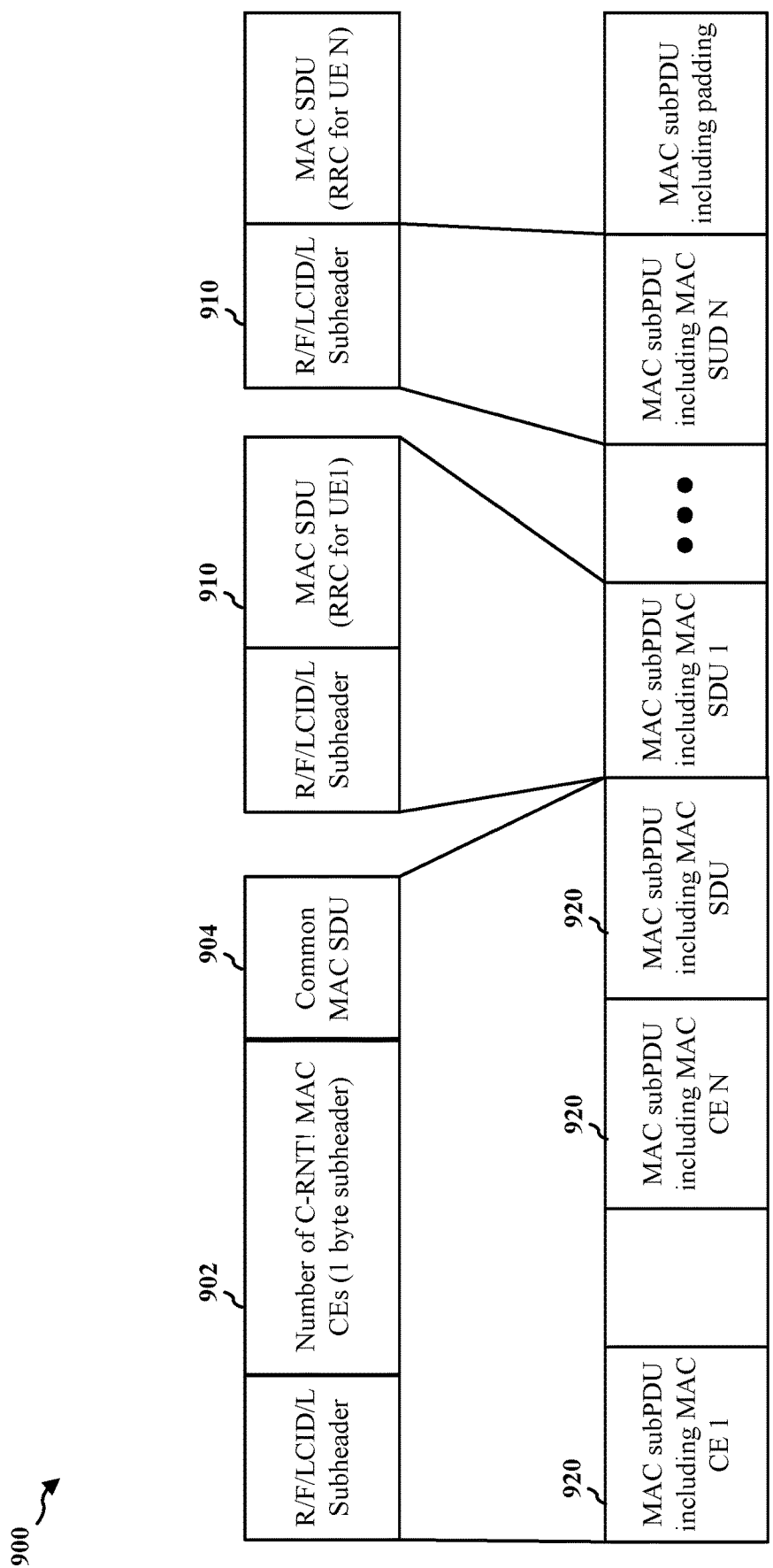
FIG. 9 is a diagram illustrating example indexing of SDUs.

In some aspects, the common MAC SDU follows a MAC subheader (e.g., 1 byte) indicating list of C-RNTI MAC CEs for indicating UEs which RRC messages (which MAC SDUs) of the UE is included in the MAC PDU. FIG. 9 is a diagram 900 illustrating example indexing of SDUs. As illustrated in FIG. 9, the common MAC SDU 904 may follow a MAC subheader 902 indicating a list of C-RNTI MAC CEs 920 for indicating association between each UE in the group of UEs 602 and the MAC SDUs 910 (each carrying one RRC message of the multiple RRC messages associated with group of UEs 602 which may each include respective group handover configuration for one UE in the group of UEs 602) for the respective UE.

Figure 10:
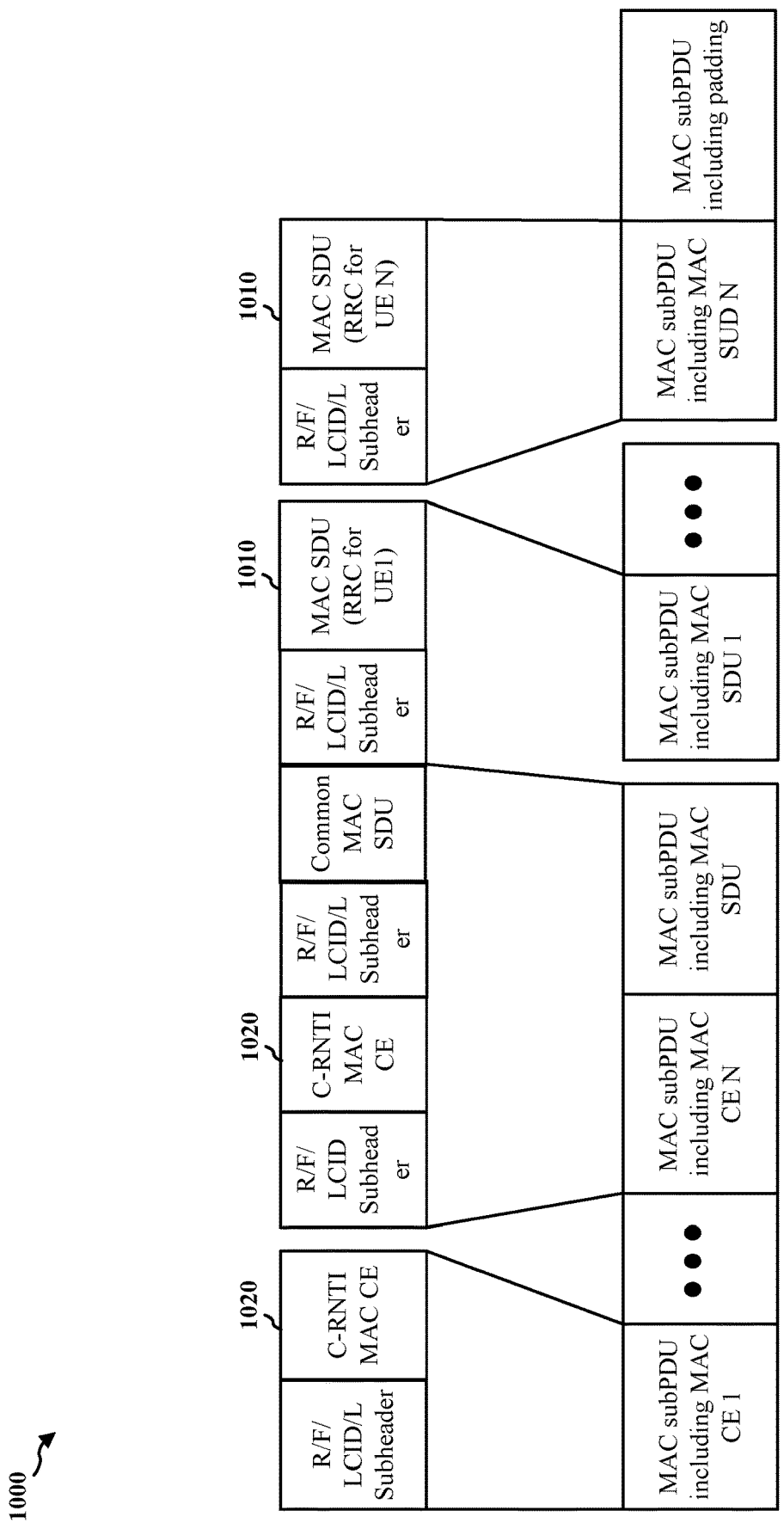
FIG. 10 is a diagram illustrating example indexing of SDUs.

In some aspects, the MAC PDU may start with a set of N (N being a positive integer) C-RNTI MAC CEs if the MAC PDU includes N RRC messages associated with the set of UEs 602 that includes N UEs. FIG. 10 is a diagram 1000 illustrating example indexing of SDUs. As illustrated in FIG. 10, the MAC PDU may start with a set of N (N being a positive integer) C-RNTI MAC CEs 1020 if the MAC PDU includes N RRC messages (e.g., which may each include respective group handover configuration for one UE in the group of UEs 602) in N respective MAC SDUs 1010 associated with the set of UEs 602 that includes N UEs. In some aspects, the C-RNTI may be associated with C-RNTI LCID code point (e.g., reserved normal or eLCID) with a length of a number of bytes (e.g., that may be fixed, such as two).

Figure 11:
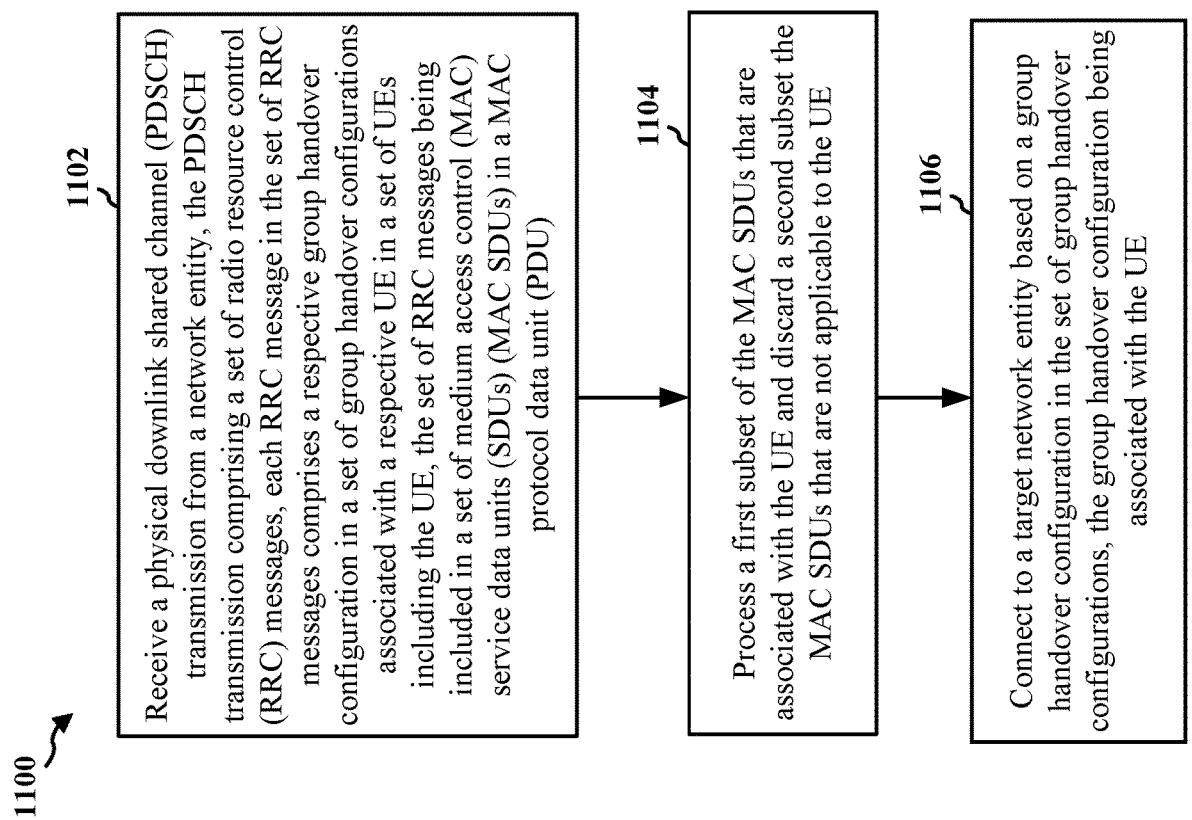
FIG. 11 is a flowchart of a method of wireless communication.

FIG. 11 is a flowchart 1100 of a method of wireless communication. The method may be performed by a UE (e.g., the UE 104, a UE in the group of UEs 602; the apparatus 1504).

At 1102, the UE may receive a physical downlink shared channel (PDSCH) transmission from a network entity, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU). For example, a UE in the group of UEs 602 may receive a physical downlink shared channel (PDSCH) transmission (e.g., 624) from a network entity 604A, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU). In some aspects, 1102 may be performed by handover component 198.

At 1104, the UE may process a first subset of the MAC SDUs that are associated with the UE and discard a second subset the MAC SDUs that are not applicable to the UE, the first subset of MAC SDUs including a common MAC SDU and at least a UE specific MAC SDU. For example, a UE in the group of UEs 602 may receive process a first subset of the MAC SDUs that are associated with the UE and discard a second subset the MAC SDUs that are not applicable to the UE, the first subset of MAC SDUs including a common MAC SDU and at least a UE specific MAC SDU. In some aspects, 1104 may be performed by handover component 198. In some aspects, the UE specific MAC SDU may be include one RRC message of the set of messages.

At 1106, the UE may connect to a target network entity based on a group handover configuration in the set of group handover configurations, the group handover configuration being associated with the UE. For example, a UE in the group of UEs 602 may connect to a target network entity 604B based on a group handover configuration in the set of group handover configurations, the group handover configuration being associated with the UE. In some aspects, 1106 may be performed by handover component 198.

Figure 12:
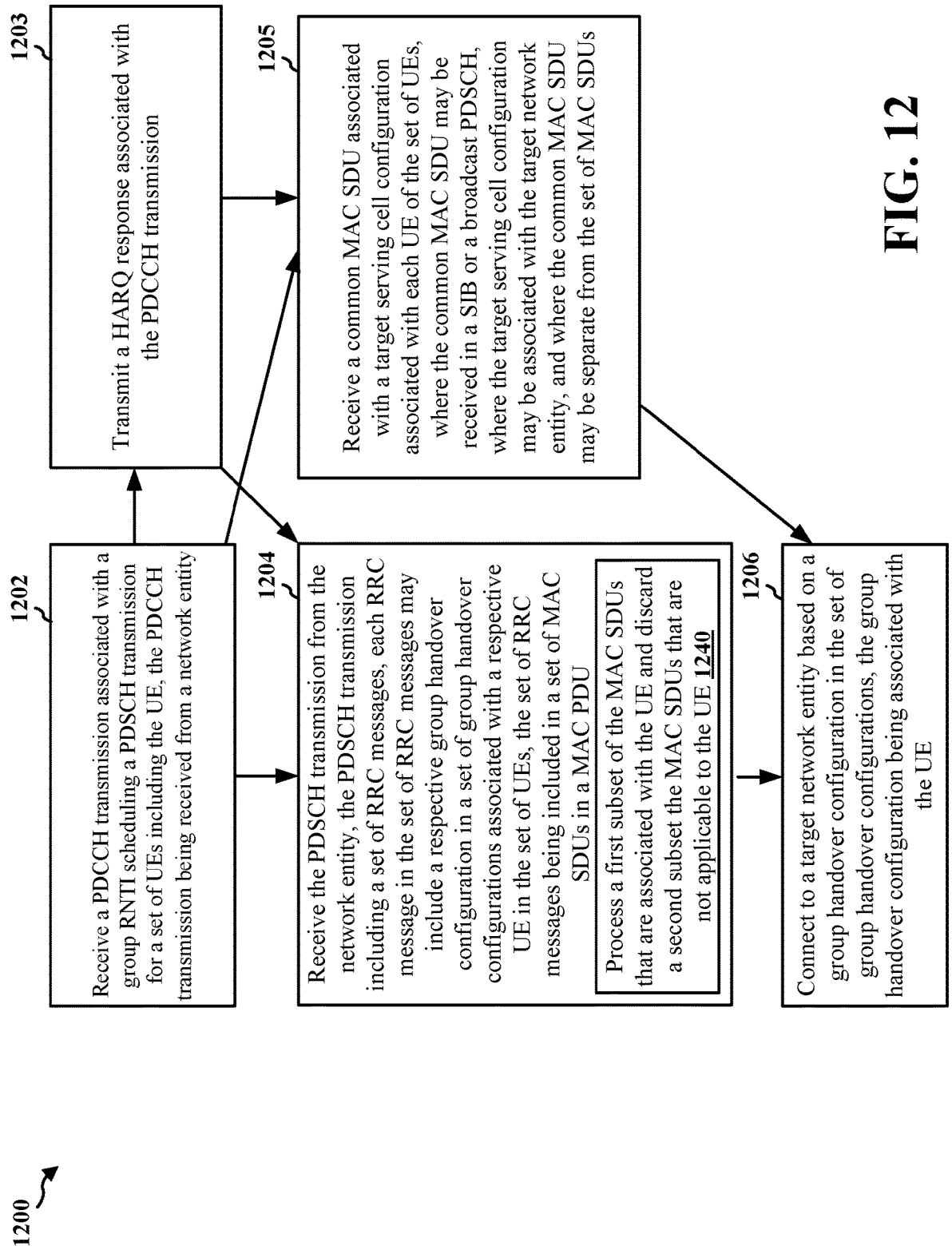
FIG. 12 is a flowchart of a method of wireless communication.

FIG. 12 is a flowchart 1200 of a method of wireless communication. The method may be performed by a UE (e.g., the UE 104, a UE in the group of UEs 602; the apparatus 1504).

At 1202, the UE may receive a PDCCH transmission associated with a group RNTI scheduling a PDSCH transmission for a set of UEs including the UE, the PDCCH transmission being received from a network entity, the group RNTI being associated with each UE in the set of UEs. For example, a UE in the group of UEs 602 may receive a PDCCH transmission (e.g., 623) associated with a group RNTI scheduling a PDSCH transmission (e.g., 624) for the set of UEs 602 including the UE, the PDCCH transmission being received from a network entity 604A, the group RNTI being associated with each UE in the set of UEs. In some aspects, 1202 may be performed by handover component 198.

At 1203, the UE may transmit a HARQ response associated with the PDCCH transmission. For example, a UE in the group of UEs 602 may transmit a HARQ response (e.g., ACK 670) associated with the PDCCH transmission. In some aspects, 1203 may be performed by handover component 198. In some aspects, the HARQ response may be independent of a feedback enable or disable configuration.

At 1204, the UE may receive the PDSCH transmission from the network entity, the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU. For example, a UE in the group of UEs 602 may receive the PDSCH transmission (e.g., 624) from the network entity 604A, the PDSCH transmission including a set of RRC messages, each RRC message in the set of RRC messages may include a respective group handover configuration in a set of group handover configurations associated with a respective UE in the set of UEs 602, the set of RRC messages being included in a set of MAC SDUs in a MAC PDU. In some aspects, 1204 may be performed by handover component 198. In some aspects, the MAC PDU may include a common MAC SDU associated with a target serving cell configuration associated with each UE of the set of UEs, where the target serving cell configuration may be associated with the target network entity. In some aspects, each RRC message in the set of RRC messages may be associated with a priority associated with high priority logical channels for SRBs. In some aspects, the common MAC SDU may be associated with a LCID, and where the LCID may be associated with a bitmap subheader representing an index representing an association between the set of RRC messages and the set of UEs. In some aspects, the common MAC SDU may be after a MAC subheader in the MAC PDU, where the MAC subheader indicates a list of C-RNTIs representing an index representing an association between the set of RRC messages and the set of UEs. In some aspects, the MAC PDU may include a set of C-RNTI MAC CEs associated with the set of RRC messages and the set of UEs.

In some aspects, at 1240, the UE may process a first subset of the MAC SDUs that are associated with the UE and discard a second subset the MAC SDUs that are not applicable to the UE, the first subset of MAC SDUs including a common MAC SDU and at least a UE specific MAC SDU. For example, a UE in the group of UEs 602 may process a first subset of the MAC SDUs that are associated with the UE and discard a second subset the MAC SDUs that are not applicable to the UE, the first subset of MAC SDUs including a common MAC SDU and at least a UE specific MAC SDU. As one example, the UE may process one of the MAC SDU 706 associated with the UE and discard other MAC SDU 706 not associated with the UE. As one example, the UE may process one of the MAC SDU 806 associated with the UE and discard other MAC SDUs not associated with the UE. As one example, the UE may process one of the MAC SDU 910 associated with the UE and discard other MAC SDUs. As one example, the UE may process one of MAC SDU 1010 associated with the UE and discard other MAC SDUs. In some aspects, 1240 may be performed by handover component 198. In some aspects, the UE specific MAC SDU may be include one RRC message of the set of messages.

At 1205, the UE may receive a common MAC SDU associated with a target serving cell configuration associated with each UE of the set of UEs, where the common MAC SDU may be received in a SIB or a broadcast PDSCH (e.g., 680), where the target serving cell configuration may be associated with the target network entity 604B, and where the common MAC SDU may be separate from the set of MAC SDUs. For example, a UE in the group of UEs 602 may receive a common MAC SDU associated with a target serving cell configuration associated with each UE of the set of UEs, where the common MAC SDU may be received in a SIB or a broadcast PDSCH, where the target serving cell configuration may be associated with the target network entity, and where the common MAC SDU may be separate from the set of MAC SDUs. In some aspects, 1205 may be performed by handover component 198.

In some aspects, the common MAC SDU may include a delta configuration with regard to a default target cell configuration or a source cell configuration for each UE of the set of UEs. In some aspects, the common MAC SDU may include a frequency or a cell ID associated with a target cell associated with the target network entity. In some aspects, the PDCCH transmission may include an index representing an association between the set of RRC messages and the set of UEs.

At 1206, the UE may connect to a target network entity based on a group handover configuration in the set of group handover configurations, the group handover configuration being associated with the UE. For example, a UE in the group of UEs 602 may connect to a target network entity 604B based on a group handover configuration in the set of group handover configurations, the group handover configuration being associated with the UE. In some aspects, 1206 may be performed by handover component 198.

Figure 13:
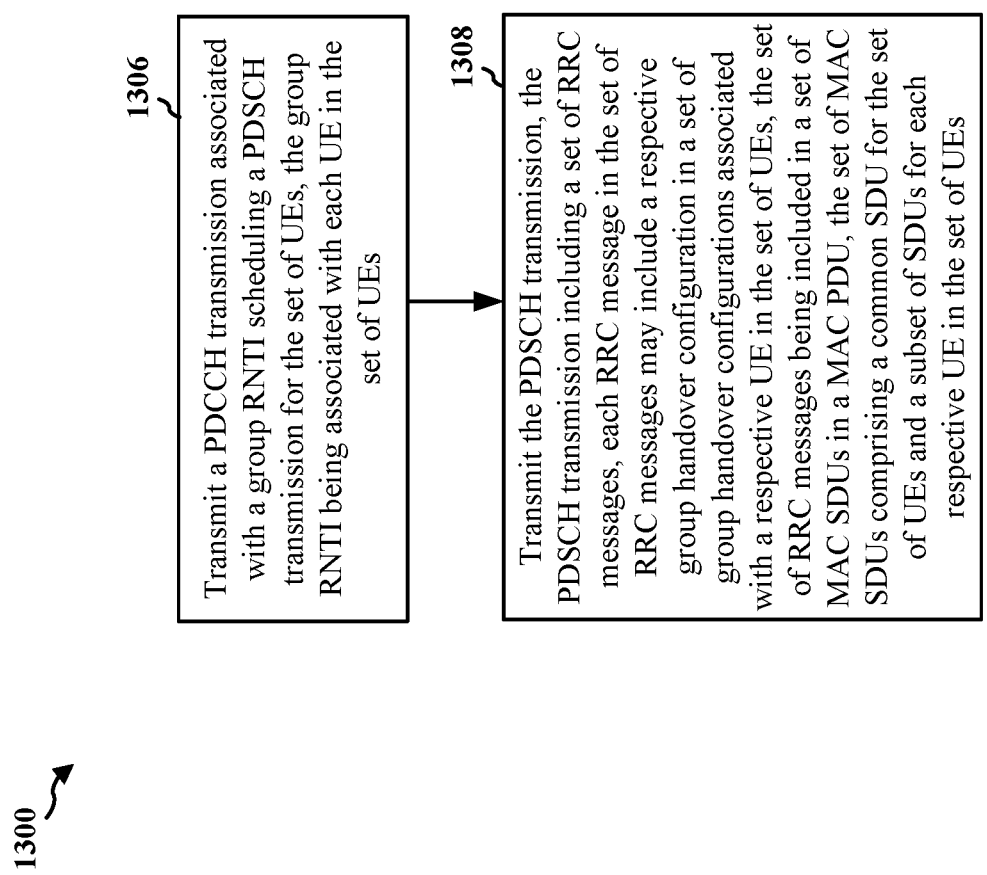
FIG. 13 is a flowchart of a method of wireless communication.

FIG. 13 is a flowchart 1300 of a method of wireless communication. The method may be performed by a network entity (e.g., the base station 102, the network entity 604A, the network entity 1502, the network entity 1602).

At 1306, the network entity may transmit a PDCCH transmission associated with a group RNTI scheduling a PDSCH transmission for a set of UEs, the group RNTI being associated with each UE in the set of UEs. For example, the network entity 604A may transmit a PDCCH transmission (e.g., 623) associated with a group RNTI scheduling a PDSCH transmission for the set of UEs, the group RNTI being associated with each UE in the set of UEs. In some aspects, 1306 may be performed by handover component 199.

At 1308, the network entity may transmit the PDSCH transmission, the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU, the set of MAC SDUs including a common MAC SDU for the set of UEs and a subset of SDUs for each respective UE in the set of UEs. For example, the network entity 604A may transmit the PDSCH transmission (e.g., 624), the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU. In some aspects, 1308 may be performed by handover component 199.

Figure 14:
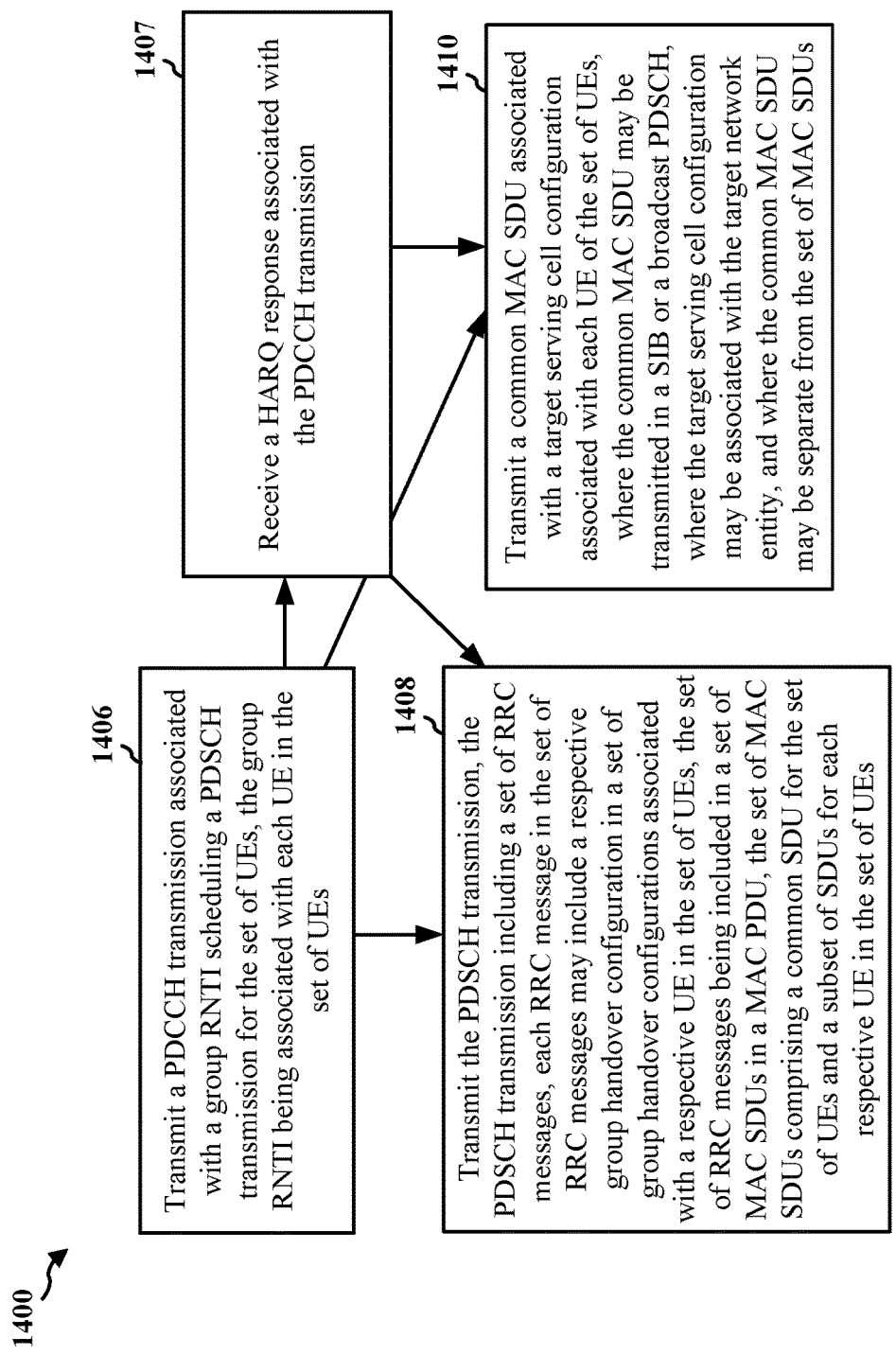
FIG. 14 is a flowchart of a method of wireless communication.

FIG. 14 is a flowchart 1400 of a method of wireless communication. The method may be performed by a network entity (e.g., the base station 102, the network entity 604A, the network entity 1502, the network entity 1602).

At 1406, the network entity may transmit a PDCCH transmission associated with a group RNTI scheduling a PDSCH transmission for a set of UEs, the group RNTI being associated with each UE in the set of UEs. For example, the network entity 604A may transmit a PDCCH transmission (e.g., 623) associated with a group RNTI scheduling a PDSCH transmission for the set of UEs, the group RNTI being associated with each UE in the set of UEs. In some aspects, 1406 may be performed by handover component 199. In some aspects, the PDCCH transmission may include an index representing an association between the set of RRC messages and the set of UEs.

At 1407, the network entity may receive a HARQ response associated with the PDCCH transmission. For example, the network entity 604A may receive a HARQ response (e.g., 670) associated with the PDCCH transmission. In some aspects, 1407 may be performed by handover component 199. In some aspects, the HARQ response may be independent of a feedback enable or disable configuration.

At 1408, the network entity may transmit the PDSCH transmission, the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU, the set of MAC SDUs including a common MAC SDU for the set of UEs and a subset of SDUs for each respective UE in the set of UEs. For example, the network entity 604A may transmit the PDSCH transmission (e.g., 624), the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU. In some aspects, 1408 may be performed by handover component 199. In some aspects, the MAC PDU may include a common MAC SDU associated with a target serving cell configuration associated with each UE of the set of UEs, where the target serving cell configuration may be associated with the target network entity. In some aspects, the common MAC SDU corresponds to a start of the MAC PDU, and where the MAC PDU may include a MAC subheader including an index representing an association between the set of RRC messages and the set of UEs. In some aspects, each RRC message in the set of RRC messages may be associated with a priority associated with high priority logical channels for SRBs. In some aspects, the common MAC SDU may be associated with a LCID, and where the LCID may be associated with a bitmap subheader representing an index representing an association between the set of RRC messages and the set of UEs. In some aspects, the common MAC SDU may be after a MAC subheader in the MAC PDU, where the MAC subheader indicates a list of C-RNTIs representing an index representing an association between the set of RRC messages and the set of UEs. In some aspects, the MAC PDU may include a set of C-RNTI MAC CEs associated with the set of RRC messages and the set of UEs.

At 1410, the network entity may transmit a common MAC SDU associated with a target serving cell configuration associated with each UE of the set of UEs, where the common MAC SDU may be transmitted in a SIB or a broadcast PDSCH, where the target serving cell configuration may be associated with the target network entity, and where the common MAC SDU may be separate from the set of MAC SDUs. For example, the network entity 604A may transmit a common MAC SDU associated with a target serving cell configuration associated with each UE of the set of UEs, where the common MAC SDU may be transmitted in a SIB or a broadcast PDSCH (e.g., 680), where the target serving cell configuration may be associated with the target network entity, and where the common MAC SDU may be separate from the set of MAC SDUs. In some aspects, 1410 may be performed by handover component 199. In some aspects, the common MAC SDU may include a delta configuration with regard to a default target cell configuration or a source cell configuration for each UE of the set of UEs. In some aspects, the common MAC SDU may include a frequency or a cell ID associated with a target cell associated with the target network entity.

Figure 15:
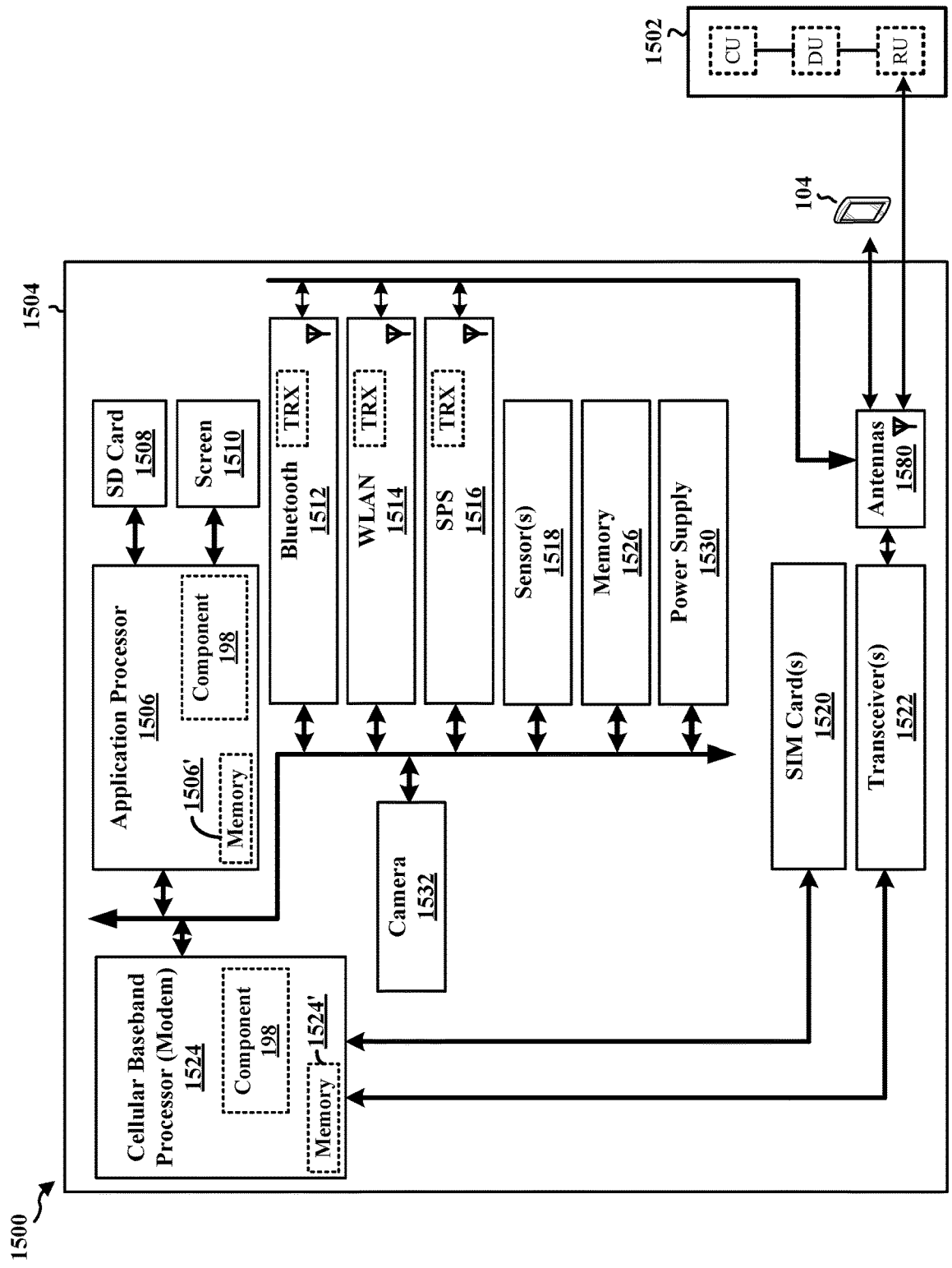
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, a satellite system module 1516 (e.g., GNSS module), one or more sensor modules 1518 (e.g., barometric pressure sensor/altimeter; motion sensor such as inertial management unit (IMU), gyroscope, and/or accelerometer(s); light detection and ranging (LI-DAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the satellite system module 1516 may include an on-chip transceiver (TRX)/receiver (RX). The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described herein. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed herein, the handover component 198 may be configured to receive a physical downlink shared channel (PDSCH) transmission from a network entity, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU). In some aspects, the handover component 198 may be further configured to process a first subset of the MAC SDUs that are associated with the UE and discard a second subset the MAC SDUs that are not applicable to the UE, the first subset of MAC SDUs including a common MAC SDU and at least a UE specific MAC SDU. In some aspects, the handover component 198 may be further configured to connect to a target network entity based on a group handover configuration in the set of group handover configurations, the group handover configuration being associated with the UE. The handover component 198 may be within the cellular baseband processor 1524, the application processor 1506, or both the cellular baseband processor 1524 and the application processor 1506. The handover component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for receiving a physical downlink shared channel (PDSCH) transmission from a network entity, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU). In some aspects, the apparatus 1504 may further include means for processing a first subset of the MAC SDUs that are associated with the UE and discard a second subset the MAC SDUs that are not applicable to the UE, the first subset of MAC SDUs including a common MAC SDU and at least a UE specific MAC SDU. In some aspects, the apparatus 1504 may further include means for connecting to a target network entity based on a group handover configuration in the set of group handover configurations, the group handover configuration being associated with the UE. In some aspects, the apparatus 1504 may further include means for receiving a common MAC SDU associated with a target serving cell configuration associated with each UE of the set of UEs, where the common MAC SDU is received in a system information block (SIB), a broadcast PDSCH, a group PDSCH, or a unicast PDSCH, where the target serving cell configuration is associated with the target network entity, and where the common MAC SDU is separate from the set of MAC SDUs. In some aspects, the apparatus 1504 may further include means for transmitting a HARQ response associated with the PDCCH transmission. The means may be the handover component 198 of the apparatus 1504 configured to perform the functions recited by the means. As described herein, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
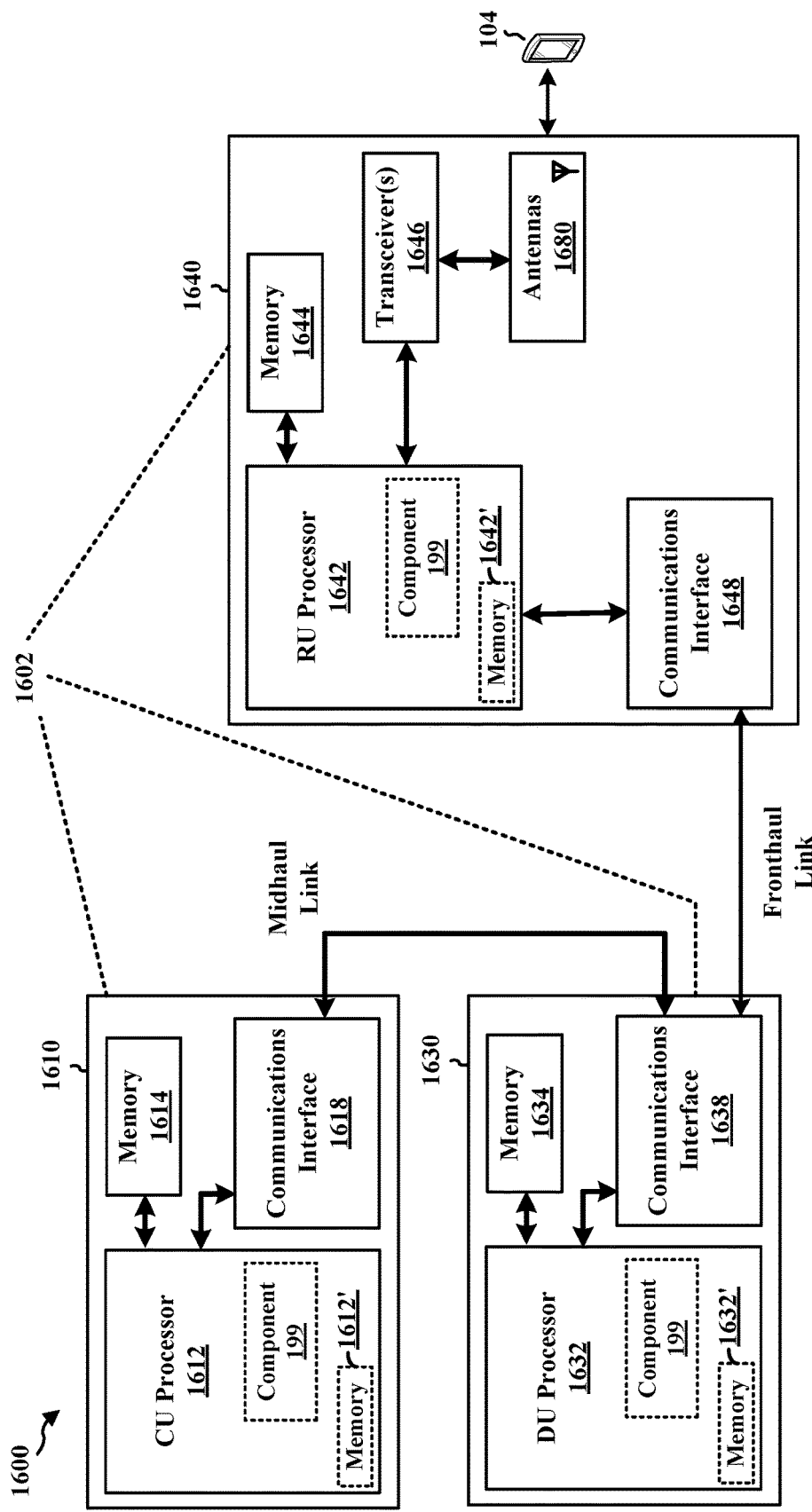
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the handover component 199 may be configured to transmit a group handover request for a set of UEs to a target network entity. In some aspects, the handover component 199 may be further configured to receive, based on the group handover request, a group handover acknowledgment (ACK) from the target network entity. In some aspects, the handover component 199 may be further configured to transmit a PDCCH transmission associated with a group RNTI scheduling a PDSCH transmission for the set of UEs, the group RNTI being associated with each UE in the set of UEs. In some aspects, the handover component 199 may be further configured to transmit the PDSCH transmission, the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU, the set of MAC SDUs including a common MAC SDU for the set of UEs and a subset of SDUs for each respective UE in the set of UEs.

The handover component 199 may be within one or more processors of one or more of the CU 1610, DU 1630, and the RU 1640. The handover component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for transmitting a PDCCH transmission associated with a group RNTI scheduling a PDSCH transmission for a set of UEs, the group RNTI being associated with each UE in the set of UEs. In some aspects, the network entity 1602 may further include means for transmitting the PDSCH transmission, the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU. In some aspects, the network entity 1602 may further include means for transmitting a common MAC SDU associated with a target serving cell configuration or a source cell configuration associated with each UE of the set of UEs, where the common MAC SDU may be transmitted in a SIB, a broadcast PDSCH, a group PDSCH, or a unicast PDSCH, where the target serving cell configuration n may be associated with the target network entity, and where the common MAC SDU may be separate from the set of MAC SDUs. In some aspects, the network entity 1602 may further include means for receiving a HARQ response associated with the PDCCH transmission. The means may be the handover component 199 of the network entity 1602 configured to perform the functions recited by the means. As described herein, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method of wireless communication at a UE, including: receiving a physical downlink shared channel (PDSCH) transmission from a network entity, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU); processing a first subset of the MAC SDUs that are associated with the UE and discard a second subset the MAC SDUs that are not applicable to the UE, the first subset of MAC SDUs including a common MAC SDU and at least a UE specific MAC SDU; and connecting to a target network entity based on a group handover configuration in the set of group handover configurations, the group handover configuration being associated with the UE.

Aspect 2 is the method of aspect 1, further including: receiving a common MAC SDU associated with a target serving cell configuration or a source cell configuration associated with each UE of the set of UEs, where the common MAC SDU may be received in a SIB, a broadcast PDSCH, a group PDSCH, or a unicast PDSCH, where the target serving cell configuration may be associated with the target network entity, and where the common MAC SDU may be separate from the set of MAC SDUs.

Aspect 3 is the method of any of aspects 1-2, where the common MAC SDU may include a delta configuration with regard to a default target cell configuration or a source cell configuration for each UE of the set of UEs.

Aspect 4 is the method of any of aspects 1-3, where the common MAC SDU may include a frequency or a cell ID associated with a target cell associated with the target network entity.

Aspect 5 is the method of any of aspects 1-4, further including receiving a physical downlink control channel (PDCCH) transmission associated with a group radio network temporary identifier (RNTI) scheduling the PDSCH transmission for the set of UEs including the UE, the PDCCH transmission being received from the network entity, the group RNTI being associated with each UE in the set of UEs.

Aspect 6 is the method of any of aspects 1-5, where the MAC PDU may include a common MAC SDU associated with a target serving cell configuration associated with each UE of the set of UEs, where the target serving cell configuration may be associated with the target network entity.

Aspect 7 is the method of any of aspects 1-6, where the common MAC SDU corresponds to a start of the MAC PDU, and where the MAC PDU may include a MAC subheader including an index representing an association between the set of RRC messages and the set of UEs.

Aspect 8 is the method of any of aspects 1-7, where each RRC message in the set of RRC messages may be associated with a priority associated with high priority logical channels for SRBs.

Aspect 9 is the method of any of aspects 1-8, where the common MAC SDU may be associated with a LCID, and where the LCID may be associated with a bitmap subheader representing an index representing an association between the set of RRC messages and the set of UEs.

Aspect 10 is the method of any of aspects 1-9, where the common MAC SDU may be after a MAC subheader in the MAC PDU, where the MAC subheader indicates a list of C-RNTIs representing an index representing an association between the set of RRC messages and the set of UEs.

Aspect 11 is the method of any of aspects 1-10, where the MAC PDU may include a set of C-RNTI MAC CEs associated with the set of RRC messages and the set of UEs.

Aspect 12 is the method of any of aspects 1-11, further including: transmitting a HARQ response associated with the PDCCH transmission.

Aspect 13 is the method of any of aspects 1-12, where the HARQ response may be independent of a feedback enable or disable configuration.

Aspect 14 is the method of any of aspects 1-13, where the method is performed at an apparatus including a transceiver or an antenna coupled to the at least one processor, and where the transceiver or the antenna may be configured to receive the PDSCH transmission.

Aspect 15 is a method of wireless communication at a network entity, including: transmitting a PDCCH transmission associated with a group RNTI scheduling a PDSCH transmission for a set of UEs, the group RNTI being associated with each UE in the set of UEs; and transmitting the PDSCH transmission, the PDSCH transmission including a set of RRC messages, each RRC message in the set of RRC messages may include a respective group handover configuration in a set of group handover configurations associated with a respective UE in the set of UEs, the set of RRC messages being included in a set of MAC SDUs in a MAC PDU, the set of MAC SDUs including a common MAC SDU for the set of UEs and a subset of SDUs for each respective UE in the set of UEs.

Aspect 16 is the method of aspect 15, further including: transmitting a common MAC SDU associated with a target serving cell configuration with each UE of the set of UEs, where the common MAC SDU may be transmitted in a SIB, a broadcast PDSCH, a group PDSCH, a unicast PDSCH, or a group handover configuration, where the target serving cell configuration may be associated with the target network entity, and where the common MAC SDU may be separate from the set of MAC SDUs.

Aspect 17 is the method of any of aspects 15-16, where the common MAC SDU may include a delta configuration with regard to a default target cell configuration or a source cell configuration for each UE of the set of UEs.

Aspect 18 is the method of any of aspects 15-17, where the common MAC SDU may include a frequency or a cell ID associated with a target cell associated with the target network entity.

Aspect 19 is the method of any of aspects 15-18, where the PDCCH transmission may include an index representing an association between the set of RRC messages and the set of UEs.

Aspect 20 is the method of any of aspects 15-19, where the MAC PDU may include a common MAC SDU associated with a target serving cell configuration associated with each UE of the set of UEs, where the target serving cell configuration may be associated with the target network entity.

Aspect 21 is the method of any of aspects 15-20, where the common MAC SDU corresponds to a start of the MAC PDU, and where the MAC PDU may include a MAC subheader including an index representing an association between the set of RRC messages and the set of UEs.

Aspect 22 is the method of any of aspects 15-21, where each RRC message in the set of RRC messages may be associated with a priority associated with high priority logical channels for SRBs.

Aspect 23 is the method of any of aspects 15-22, where the common MAC SDU may be associated with a LCID, and where the LCID may be associated with a bitmap subheader representing an index representing an association between the set of RRC messages and the set of UEs.

Aspect 24 is the method of any of aspects 15-23, where the common MAC SDU may be after a MAC subheader in the MAC PDU, where the MAC subheader indicates a list of C-RNTIs representing an index representing an association between the set of RRC messages and the set of UEs.

Aspect 25 is the method of any of aspects 15-24, where the MAC PDU may include a set of C-RNTI MAC CEs associated with the set of RRC messages and the set of UEs.

Aspect 26 is the method of any of aspects 15-25, further including: receiving a HARQ response associated with the PDCCH transmission.

Aspect 27 is the method of any of aspects 15-26, where the HARQ response may be independent of a feedback enable or disable configuration.

Aspect 28 is the method of any of aspects 15-27, where the method is performed at an apparatus including a transceiver or an antenna coupled to the at least one processor, and where the transceiver or the antenna may be configured to transmit the PDSCH transmission.

Aspect 29 is an apparatus for wireless communication at a device including a memory and at least one processor coupled to the memory and, based at least in part on information stored in the memory, configured to perform a method in accordance with any of aspects 1-14. The apparatus may include at least one of a transceiver or an antenna coupled to the at least one processor.

Aspect 30 is an apparatus for wireless communication, including means for performing a method in accordance with any of aspects 1-14.

Aspect 31 is a non-transitory computer-readable medium including instructions that, when executed by an apparatus, cause the apparatus to perform a method in accordance with any of aspects 1-14.

Aspect 32 is an apparatus for wireless communication at a device including a memory and at least one processor coupled to the memory and, based at least in part on information stored in the memory, configured to perform a method in accordance with any of aspects 15-28. The apparatus may include at least one of a transceiver or an antenna coupled to the at least one processor.

Aspect 33 is an apparatus for wireless communication, including means for performing a method in accordance with any of aspects 15-28.

Aspect 34 is a non-transitory computer-readable medium including instructions that, when executed by an apparatus, cause the apparatus to perform a method in accordance with any of aspects 15-28.

What is claimed is:

1. An apparatus for wireless communication at a user equipment (UE), comprising:
a memory; and
at least one processor coupled to the memory, wherein the at least one processor is configured to:
receive a physical downlink shared channel (PDSCH) transmission from a network entity, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU);
process a first subset of the MAC SDUs that are associated with the UE and discard a second subset the MAC SDUs that are not applicable to the UE, the first subset of MAC SDUs comprising a common MAC SDU and at least a UE specific MAC SDU; and
connect to a target network entity based on a group handover configuration in the set of group handover configurations, the group handover configuration being associated with the UE.

2. The apparatus of claim 1, wherein the at least one processor is configured to:
receive the common MAC SDU associated with a target serving cell configuration associated with each UE of the set of UEs, wherein the common MAC SDU is received in a system information block (SIB), a broadcast PDSCH, a group PDSCH, or a unicast PDSCH, wherein the target serving cell configuration is associated with the target network entity, and wherein the common MAC SDU is separate from the set of MAC SDUs.

3. The apparatus of claim 2, wherein the common MAC SDU comprises a delta configuration with regard to a default target cell configuration or a source cell configuration for each UE of the set of UEs.

4. The apparatus of claim 2, wherein the common MAC SDU comprises a frequency or a cell identifier (ID) associated with a target cell associated with the target network entity.

5. The apparatus of claim 1, wherein the MAC PDU comprises a common MAC SDU associated with a target serving cell configuration associated with each UE of the set of UEs, wherein the target serving cell configuration is associated with the target network entity.

6. The apparatus of claim 5, wherein the common MAC SDU corresponds to a start of the MAC PDU, and wherein the MAC PDU comprises a MAC subheader comprising an index representing an association between the set of RRC messages and the set of UEs.

7. The apparatus of claim 6, wherein each RRC message in the set of RRC messages is associated with a priority associated with high priority logical channels for signal radio bearers (SRBs).

8. The apparatus of claim 5, wherein the common MAC SDU is associated with a logical channel identifier (LCID), and wherein the LCID is associated with a bitmap subheader representing an index representing an association between the set of RRC messages and the set of UEs.

9. The apparatus of claim 5, wherein the common MAC SDU is after a MAC subheader in the MAC PDU, wherein the MAC subheader indicates a list of cell-RNTIs (C-RNTIs) representing an index representing an association between the set of RRC messages and the set of UEs.

10. The apparatus of claim 5, wherein the MAC PDU further comprises a set of cell-RNTI (C-RNTI) MAC control elements (MAC CEs) associated with the set of RRC messages and the set of UEs.

11. The apparatus of claim 1, wherein the UE is configured to:
receive a physical downlink control channel (PDCCH) transmission associated with a group radio network temporary identifier (RNTI) scheduling the PDSCH transmission for the set of UEs including the UE, the PDCCH transmission being received from the network entity, the group RNTI being associated with each UE in the set of UEs.

12. The apparatus of claim 11, wherein the at least one processor is configured to:
transmit a hybrid automatic repeat request (HARQ) response associated with a HARQ process configured for the PDCCH transmission.

13. The apparatus of claim 12, wherein the HARQ response is independent of a feedback enable or disable configuration.

14. The apparatus of claim 1, further comprising a transceiver or an antenna coupled to the at least one processor, and wherein the transceiver or the antenna is configured to receive the PDSCH transmission.

15. An apparatus for wireless communication at a network entity, comprising:
a memory; and
at least one processor coupled to the memory, wherein the at least one processor is configured to:
transmit a physical downlink control channel (PDCCH) transmission associated with a group radio network temporary identifier (RNTI) scheduling a physical downlink shared channel (PDSCH) transmission for a set of user equipments (UEs), the group RNTI being associated with each UE in the set of UEs; and
transmit the PDSCH transmission, the PDSCH transmission comprising a set of radio resource control (RRC) messages, each RRC message in the set of RRC messages comprises a respective group handover configuration in a set of group handover configurations associated with a respective UE in the set of UEs, the set of RRC messages being included in a set of medium access control (MAC) service data units (SDUs) (MAC SDUs) in a MAC protocol data unit (PDU), the set of MAC SDUs comprising a common SDU for the set of UEs and a subset of SDUs for each respective UE in the set of UEs.

16. The apparatus of claim 15, wherein the at least one processor is configured to:
transmit the common MAC SDU associated with a target serving cell configuration associated with each UE of the set of UEs in a system information block (SIB), a broadcast PDSCH, a group PDSCH, a unicast PDSCH, or a group handover configuration, wherein the target serving cell configuration is associated with a target network entity, and wherein the common MAC SDU is separate from the set of MAC SDUs.

17. The apparatus of claim 16, wherein the common MAC SDU comprises a delta configuration with regard to a default target cell configuration or a source cell configuration for each UE of the set of UEs.

18. The apparatus of claim 16, wherein the common MAC SDU comprises a frequency or a cell identifier (ID) associated with a target cell associated with the target network entity.

19. The apparatus of claim 15, wherein the group RNTI is associated with an index representing an association between the set of RRC messages and the set of UEs.

20. The apparatus of claim 15, wherein the MAC PDU comprises a common MAC SDU associated with a target serving cell configuration associated with each UE of the set of UEs, wherein the target serving cell configuration is associated with a target network entity.

21. The apparatus of claim 20, wherein the common MAC SDU corresponds to a start of the MAC PDU, and wherein the MAC PDU comprises a MAC subheader comprising an index representing an association between the set of RRC messages and the set of UEs.

22. The apparatus of claim 21, wherein each RRC message in the set of RRC messages is associated with a priority associated with high priority logical channels for signal radio bearers (SRBs).

23. The apparatus of claim 20, wherein the common MAC SDU is associated with a logical channel identifier (LCID), and wherein the LCID is associated with a bitmap subheader representing an index representing an association between the set of RRC messages and the set of UEs.

24. The apparatus of claim 20, wherein the common MAC SDU is after a MAC subheader in the MAC PDU, wherein the MAC subheader indicates a list of cell-RNTIs (C-RNTIs) representing an index representing an association between the set of RRC messages and the set of UEs.

25. The apparatus of claim 20, wherein the MAC PDU further comprises a set of cell-RNTI (C-RNTI) MAC control elements (MAC CEs) associated with the set of RRC messages and the set of UEs.

26. The apparatus of claim 15, wherein the at least one processor is configured to:
receive a hybrid automatic repeat request (HARQ) response associated with a HARQ process configured for the PDCCH transmission.

27. The apparatus of claim 26, wherein the HARQ response is independent of a feedback enable or disable configuration.

28. The apparatus of claim 15, further comprising a transceiver or an antenna coupled to the at least one processor, and wherein the transceiver or the antenna is configured to transmit the PDSCH transmission.

29. A method of wireless communication at a user equipment (UE), comprising:
receiving a physical downlink shared channel (PDSCH) transmission from a network entity, the PDSCH transmission comprising a set of radio resource control (RRC) messages, each RRC message in the set of RRC messages comprises a respective group handover configuration in a set of group handover configurations associated with a respective UE in a set of UEs including the UE, the set of RRC messages being included in a set of medium access control (MAC) service data units (SDUs) (MAC SDUs) in a MAC protocol data unit (PDU);

processing a first subset of the MAC SDUs that are associated with the UE and discard a second subset the MAC SDUs that are not applicable to the UE, the first subset of MAC SDUs including a common MAC SDU and at least a UE specific MAC SDU; and connecting to a target network entity based on a group handover configuration in the set of group handover configurations, the group handover configuration being associated with the UE.

30. A method of wireless communication at a network entity, comprising:

transmitting a physical downlink control channel (PDCCH) transmission associated with a group radio network temporary identifier (RNTI) scheduling a physical downlink shared channel (PDSCH) transmission for a set of UEs, the group RNTI being associated with each UE in the set of UEs; and transmitting the PDSCH transmission, the PDSCH transmission comprising a set of radio resource control (RRC) messages, each RRC message in the set of RRC messages comprises a respective group handover configuration in a set of group handover configurations associated with a respective UE in the set of UEs, the set of RRC messages being included in a set of medium access control (MAC) service data units (SDUs) (MAC SDUs) in a MAC protocol data unit (PDU), the set of MAC SDUs including a common SDU for the set of UEs and a subset of SDUs for each respective UE in the set of UEs.

* * * * *